(12) United States Patent
Merlin et al.

(10) Patent No.: US 9,781,627 B2
(45) Date of Patent: Oct. 3, 2017

(54) SYSTEMS AND METHODS FOR GENERATING AND DECODING SHORT CONTROL FRAMES IN WIRELESS COMMUNICATIONS

(71) Applicant: QUALCOMM Incorporated, San Diego, CA (US)

(72) Inventors: Simone Merlin, Solana Beach, CA (US); Santosh Paul Abraham, San Diego, CA (US); Maarten Menzo Wentink, Naarden (NL); Zhi Quan, Livemore, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 14/097,111

(22) Filed: Dec. 4, 2013

(65) Prior Publication Data
US 2014/0301208 A1    Oct. 9, 2014

Related U.S. Application Data

(60) Provisional application No. 61/865,537, filed on Aug. 13, 2013, provisional application No. 61/821,149, (Continued)

(51) Int. Cl.
*H04W 28/02* (2009.01)
*H04W 74/00* (2009.01)
*H04L 1/00* (2006.01)

(52) U.S. Cl.
CPC ....... *H04W 28/0273* (2013.01); *H04L 1/0029* (2013.01); *H04L 1/0073* (2013.01);
(Continued)

(58) Field of Classification Search
None
See application file for complete search history.

(56) References Cited

U.S. PATENT DOCUMENTS 6,052,812 A    4/2000 Chen et al.
6,768,721 B1   7/2004 Schmitz et al.
(Continued)

FOREIGN PATENT DOCUMENTS

CN    1764157 A    4/2006
CN    1806417 A    7/2006
(Continued)

OTHER PUBLICATIONS

Asterjadhi A., et al., "CC9-Resolution-CID 3; 11-13-1027-03-00ah-cc9-resolution-cid-3," IEEE Draft; 11-13-1027-03-00AH-CC9-Resolution-CID-3, IEEE-SA Mentor, Piscataway, NJ, USA, vol. 802.11ah, No. 3, Sep. 16, 2013 (Sep. 16, 2013), pp. 1-9, XP068062909, [retrieved on Sep. 16, 2013].
(Continued)

*Primary Examiner* — Yemane Mesfin
*Assistant Examiner* — Peter Chen
(74) *Attorney, Agent, or Firm* — Knobbe, Martens, Olson

(57) ABSTRACT

Systems, methods, and devices for communicating short control frames are described herein. In some aspects, a method of wireless communication includes generating a control frame comprising a contention free end (CF-end) frame, the CF-end frame comprising a physical layer preamble having a type field, the type field including an indicator indicating the CF-end frame is a null data packet (NDP). The method further includes transmitting the control frame.

43 Claims, 13 Drawing Sheets

Related U.S. Application Data filed on May 8, 2013, provisional application No. 61/809,835, filed on Apr. 8, 2013.

(52) U.S. Cl.
CPC ......... *H04W 74/002* (2013.01); *H04L 1/0025* (2013.01); *H04L 1/0079* (2013.01)

(56) References Cited

U.S. PATENT DOCUMENTS

| | | |
|---|---|---|
| 7,675,911 B2 | 3/2010 | Singh et al. |
| 7,680,148 B2 | 3/2010 | Nishibayashi et al. |
| 7,760,700 B2 | 7/2010 | Frederiks et al. |
| 7,869,418 B2 | 1/2011 | Nishibayashi et al. |
| 7,872,997 B2 | 1/2011 | Qian |
| 7,882,412 B2 | 2/2011 | Nanda |
| 7,903,632 B2 | 3/2011 | Nishibayashi et al. |
| 8,023,453 B2 | 9/2011 | Sammour et al. |
| 8,223,639 B2 | 7/2012 | Seok |
| 8,369,257 B2 | 2/2013 | Chu et al. |
| 8,675,633 B2 | 3/2014 | Nabetani et al. |
| 8,830,917 B1 | 9/2014 | Zhang et al. |
| 8,832,515 B2 | 9/2014 | Asterjadhi et al. |
| 8,885,495 B1 | 11/2014 | Liu et al. |
| 9,019,822 B2 | 4/2015 | Asterjadhi et al. |
| 9,131,398 B2 | 9/2015 | Liu et al. |
| 9,131,399 B2 | 9/2015 | Liu et al. |
| 2002/0172208 A1 | 11/2002 | Malkamaki |
| 2004/0254700 A1 | 12/2004 | Fehr et al. |
| 2005/0195750 A1 | 9/2005 | Le et al. |
| 2005/0195858 A1 | 9/2005 | Nishibayashi et al. |
| 2006/0007927 A1 | 1/2006 | Lee et al. |
| 2006/0018332 A1 | 1/2006 | Kakani et al. |
| 2006/0034174 A1 | 2/2006 | Nishibayashi et al. |
| 2006/0034274 A1 | 2/2006 | Kakani et al. |
| 2006/0034277 A1 | 2/2006 | Jang et al. |
| 2006/0034317 A1 | 2/2006 | Hong et al. |
| 2006/0048034 A1 | 3/2006 | Cho |
| 2006/0083233 A1 | 4/2006 | Nishibayashi et al. |
| 2006/0087998 A1 | 4/2006 | Saito et al. |
| 2006/0092871 A1 | 5/2006 | Nishibayashi et al. |
| 2006/0136614 A1 | 6/2006 | Kakani et al. |
| 2007/0002810 A1 | 1/2007 | Trainin et al. |
| 2007/0014237 A1 | 1/2007 | Nishibayashi et al. |
| 2007/0058623 A1 | 3/2007 | Moorti et al. |
| 2007/0110055 A1 | 5/2007 | Fischer et al. |
| 2007/0110324 A1 | 5/2007 | Kwon et al. |
| 2007/0113140 A1 | 5/2007 | Roh et al. |
| 2007/0127424 A1 | 6/2007 | Kwon et al. |
| 2007/0171858 A1* | 7/2007 | Grandhi ............ H04W 74/002 370/328 |
| 2007/0171933 A1 | 7/2007 | Sammour et al. |
| 2007/0258466 A1 | 11/2007 | Kakani |
| 2008/0037465 A1 | 2/2008 | Ngo et al. |
| 2008/0037466 A1 | 2/2008 | Ngo et al. |
| 2008/0049707 A1 | 2/2008 | Kwon et al. |
| 2008/0056303 A1 | 3/2008 | Sebire et al. |
| 2008/0095168 A1 | 4/2008 | Frazier |
| 2008/0186890 A1 | 8/2008 | Shao et al. |
| 2009/0092039 A1 | 4/2009 | Niu et al. |
| 2010/0002646 A1 | 1/2010 | Nishibayashi et al. |
| 2010/0008381 A1 | 1/2010 | Jang et al. |
| 2010/0050041 A1 | 2/2010 | Chang et al. |
| 2010/0074277 A1 | 3/2010 | Nishibayashi et al. |
| 2010/0091654 A1 | 4/2010 | Ohno et al. |
| 2010/0146359 A1 | 6/2010 | Duan et al. |
| 2010/0182949 A1 | 7/2010 | Ji |
| 2010/0302981 A1 | 12/2010 | Tsai et al. |
| 2011/0002219 A1 | 1/2011 | Kim et al. |
| 2011/0026505 A1 | 2/2011 | Trainin |
| 2011/0063991 A1 | 3/2011 | Sampath et al. |
| 2011/0069688 A1 | 3/2011 | Zhang et al. |
| 2011/0096710 A1 | 4/2011 | Liu et al. |
| 2011/0103280 A1 | 5/2011 | Liu et al. |
| 2011/0107168 A1 | 5/2011 | Jung et al. |
| 2011/0246840 A1 | 10/2011 | Khoshnevis et al. |
| 2011/0280182 A1 | 11/2011 | Kim et al. |
| 2011/0317609 A1 | 12/2011 | Sammour et al. |
| 2011/0317630 A1 | 12/2011 | Zhu et al. |
| 2012/0084616 A1 | 4/2012 | Wentink |
| 2012/0201177 A1 | 8/2012 | Adachi et al. |
| 2012/0226955 A1 | 9/2012 | Norair |
| 2012/0230242 A1 | 9/2012 | Kim et al. |
| 2012/0236971 A1 | 9/2012 | Taghavi et al. |
| 2012/0314653 A1 | 12/2012 | Liu |
| 2012/0314695 A1 | 12/2012 | Liu |
| 2012/0327870 A1 | 12/2012 | Grandhi et al. |
| 2013/0044877 A1* | 2/2013 | Liu .................... H04W 8/26 380/270 |
| 2013/0083781 A1 | 4/2013 | Zhang et al. |
| 2013/0094488 A1* | 4/2013 | Choi .................. H04W 16/28 370/338 |
| 2013/0142095 A1 | 6/2013 | Calcev et al. |
| 2013/0170345 A1 | 7/2013 | Merlin et al. |
| 2013/0223210 A1 | 8/2013 | Asterjadhi et al. |
| 2013/0223211 A1 | 8/2013 | Asterjadhi et al. |
| 2013/0223213 A1 | 8/2013 | Asterjadhi et al. |
| 2013/0223338 A1 | 8/2013 | Asterjadhi et al. |
| 2013/0223345 A1 | 8/2013 | Asterjadhi et al. |
| 2013/0301569 A1* | 11/2013 | Wang ................. H04L 5/0055 370/329 |
| 2014/0185473 A1* | 7/2014 | Wong ................ H04W 74/0808 370/252 |
| 2014/0254471 A1* | 9/2014 | Fang ................... H04W 84/047 370/315 |
| 2014/0328237 A1 | 11/2014 | Sammour et al. |
| 2015/0029922 A1* | 1/2015 | Zheng ................ H04W 52/0216 370/311 |
| 2015/0244619 A1* | 8/2015 | Zheng .................... H03M 13/09 370/392 |
| 2015/0249529 A1* | 9/2015 | Zheng ................. H04L 1/1685 370/336 |
| 2015/0288427 A1* | 10/2015 | Wang ................. H04W 72/1273 370/329 |
| 2015/0327120 A1 | 11/2015 | Liu |

FOREIGN PATENT DOCUMENTS

| | | |
|---|---|---|
| CN | 101006684 A | 7/2007 |
| CN | 101124762 A | 2/2008 |
| CN | 101855872 A | 10/2010 |
| CN | 102333376 A | 1/2012 |
| EP | 0286383 A2 | 10/1988 |
| EP | 1626519 A2 | 2/2006 |
| JP | 2005252897 A | 9/2005 |
| JP | 2006054673 A | 2/2006 |
| JP | 2006121199 A | 5/2006 |
| JP | 2007527167 A | 9/2007 |
| JP | 2008507226 A | 3/2008 |
| JP | 2008508812 A | 3/2008 |
| JP | 2008509622 A | 3/2008 |
| JP | 2008079045 A | 4/2008 |
| JP | 2008092249 A | 4/2008 |
| JP | 2008511243 A | 4/2008 |
| JP | 2013510469 A | 3/2013 |
| KR | 20070087547 A | 8/2007 |
| RU | 2161873 C2 | 1/2001 |
| RU | 2364037 C2 | 8/2009 |
| WO | WO-2004109440 A2 | 12/2004 |
| WO | WO-2005081498 A1 | 9/2005 |
| WO | WO-2006016745 A1 | 2/2006 |
| WO | WO-2006022484 A1 | 3/2006 |
| WO | WO-2006115371 A1 | 11/2006 |
| WO | WO-2007033313 A2 | 3/2007 |
| WO | WO-2009157901 A1 | 12/2009 |
| WO | WO-2010150124 A1 | 12/2010 |
| WO | WO-2011056790 A1 | 5/2011 |
| WO | WO-2011159831 A1 | 12/2011 |
| WO | WO-2012074316 A2 | 6/2012 |
| WO | WO-2013101679 | 7/2013 |
| WO | WO-2013184889 A1 | 12/2013 |

(56) References Cited

FOREIGN PATENT DOCUMENTS

| WO | WO-2014011507 A1 | 1/2014 |
|---|---|---|
| WO | WO-2014042595 A1 | 3/2014 |
| WO | WO-2014042596 A1 | 3/2014 |

OTHER PUBLICATIONS

Asterjadhi A., et al., "CC9-Resolution-CIDs for Speed Frame Exchange; 11-13-1062-02-00ah-cc9-resolution-cids-for-speed-frame-exchange," IEEE Draft; 11-13-1062-02-00AH-CC9-Resolution-CIDS-For-Speed-Frame-Exchange, IEEE-SA Mentor, Piscataway, NJ, USA, vol. 802.11ah, No. 2, Sep. 15, 2013 (Sep. 15, 2013), pp. 1-8, XP068062956, [retrieved on Sep. 15, 2013].

International Search Report and Written Opinion—PCT/US2013/073333—ISA/EPO—Jun. 25, 2014.

Zheng S. et al., "TGah D1.0 Comment Resolutions for NDP Modified ACK" IEEE Draft; 11-13-1426-01-00AH-Resolution-For-Draft-1-0-Comments-In-Clause-8-3-5-1-4, IEEE-SA Mentor, Piscataway, NJ, USA, vol. 802.11ah, No. 1, Nov. 13, 2013 (Nov. 13, 2013), doc.: IEEE 802.11-13/142R1; pp. 1-4, XP068063455, [retrieved on Nov. 13, 2013].

Park M., et al., "AP Assisted Medium Synchronization ; 11-12-0840-01-00ah-ap-assisted-medium-synchronization", IEEE SA Mentor; 11-12-0840-01-00AH-AP-Assisted-Medium-Synchronization, IEEE-SA Mentor, Piscataway, NJ USA, vol. 802.11ah, No. 1, Sep. 17, 2012 (Sep. 17, 2012), pp. 1-16, XP068039371.

Park M., IEEE P802.11, Wireless LANS, Specification Framework for TGah, TGah Spec Framework, doc.: IEEE 802.11-11/1137r14, Mar. 2013, pp. 1-67.

Park M., "Specification framework for TGah; 11-11-1137-14-00ah-specification-framework-for-tgah," IEEE SA Mentor; 11-11-1137-14-00AH-Specification-Framework-For-Tgah, IEEE-SA Mentor, Piscataway, NJ, USA, vol. 802.11ah, No. 14, Mar. 20, 2013 (Mar. 20, 2013), pp. 1-66, XP068053521, [retrieved on Mar. 20, 2013].

Park M., "Specification framework for TGah; 11-11-1137-15-00ah-specification-framework-for-tgah," IEEE SA Mentor, 11-11-1137-15-00AH-Specification-Framework-For-Tgah, IEEE-SA Mentor, Piscataway, NJ, USA, vol. 802.11ah, No. 15, May 16, 2013 (May 16, 2013), pp. 1-76, XP068053522, [retrieved on May 16, 2013].

Partial International Search Report—PCT/US2013/073333—ISA/EPO—May 8, 2014.

Seok Y., et al., "TXOP Truncation ; 11-12-1302-00-00ah-txop-truncation", IEEE SA Mentor; 11-12-1302-00-00AH-TXOP-Truncation, IEEE-SA Mentor, Piscataway, NJ USA, vol. 802.11ah, Nov. 12, 2012 (Nov. 12, 2012), pp. 1-14, XP068040140.

Park M., "IEEE P802.11, Wireless LANS, Proposed Specification Framework for Tgah", TGah Spec Framework, doc.: IEEE 802.11-11/1137r11, (Sep. 2012); pp. 1-36.

Park M., "IEEE P802.11, Wireless LANS, Proposed Specification Framework for Tgah", TGah Spec Framework, doc.: IEEE 802.11-11/1137r6, (Mar. 2012); pp. 1-13.

Gong F et al., "A new error control scheme for high speed networks", Tactical Communications Conference, vol. 1 .Digital Technology F or the Tactical Communicator., Proceedings of the 1994 Fort Wayne, IN, USA May 10-12, 1994, New York, NY, USA .IEEE, US, May 10, 1994 (May 10, 1994), pp. 437-448, XP010149096, DOI: 10.1109/TCC.1994.472100 ISBN: 978-0-7803-2004-8.

Liu Y.,et al.,"Short Ack, Doc No. IEEE 802.11-12/0324r2", IEEE, Mar. 12, 2012, pp. 1-15.

Son J, "Resolution for Acknowledgement Frame Related Comments" IEEE P802.15 Wireless Personal Area Networks(WPANs), Jul. 9, 2010, pp. 1-3.

Asterjadhi A. et al., "Short BA; 11 -12-0859-00-00ah-short-ba", IEEE SA Mentor; 11-12-0859-00-00AH-Short-BA, IEEE-SA Mentor, Piscataway, NJ USA, vol. 802.11 ah, Jul. 16, 2012 (Jul. 16, 2012), pp. 1-11, XP068039407, [retrieved on Jul. 16, 2012].

Asterjadhi A., et al., "Short Block Ack", Doc: IEEE 802.11-12/0859r0, pp. 1-11, Jul. 15, 2012, https://mentor.ieee.org/802.11/dcn/12/11-12-0859-00-0ah-short-ba.pptx.

* cited by examiner

| Field of SIG-A | Bits | Comments |
| --- | --- | --- |
| 605 — Control | 1 | Indicates if preamble is a control frame |
| 610 — Type | 3 | Defines the type |
| 615 — Address/Identifier | 13 (AID)/32 (FCS)/ 40 (Partial RA) | Identifies the ACK; |
| 620 — Rate adaptation Info | 1-4 | Either an absolute or relative (to received packet) MCS indication |
| 625 — CRC | 4 | |
| 630 — Tail | 6 | Needed for BCC |
| Total | 36/52 | 36 if 1MHz; 52 if 2MHz |

FIG. 6

| Field of SIG-A | Bits | Comments |
|---|---|---|
| 705 — Length | 12 | Some Length values may identify the type;<br>Another option is that only LENGTH =0 indicates control Type and the Type field is present |
| 710 — Type | | Optional; Type may be indicated by the Length |
| 715 — Address/Identifier | 13 (AID)/32 (FCS)/ 40 (Partial RA) | |
| 725 — CRC | 4 | |
| 730 — Tail | 6 | Needed for BCC |
| Total | 36/52 | 36 if 1MHz; 52 if 2MHz |

FIG. 7

SYSTEMS AND METHODS FOR GENERATING AND DECODING SHORT CONTROL FRAMES IN WIRELESS COMMUNICATIONS

CROSS REFERENCE TO RELATED APPLICATIONS

The present application claims priority to provisional U.S. Application Ser. No. 61/809,835, entitled "SYSTEMS AND METHODS FOR GENERATING AND DECODING SHORT CONTROL FRAMES IN WIRELESS COMMUNICATIONS," filed Apr. 8, 2013, assigned to the assignee hereof and incorporated herein by reference in its entirety. The present application further claims priority to provisional U.S. Application Ser. No. 61/821,149, entitled "SYSTEMS AND METHODS FOR GENERATING AND DECODING SHORT CONTROL FRAMES IN WIRELESS COMMUNICATIONS," filed May 8, 2013, assigned to the assignee hereof and incorporated herein by reference in its entirety. The present application further claims priority to provisional U.S. Application Ser. No. 61/865,537, entitled "SYSTEMS AND METHODS FOR GENERATING AND DECODING SHORT CONTROL FRAMES IN WIRELESS COMMUNICATIONS," filed Aug. 13, 2013, assigned to the assignee hereof and incorporated herein by reference in its entirety.

BACKGROUND

Field

The present application relates generally to wireless communications, and more specifically to systems, methods, and devices for communicating short control frames.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may comprise control frames. Control frames having control information and payload data may cause significant overhead and increased processing latency for receiving devices. As such, systems, methods, and non-transitory computer-readable media are needed for reducing network and processing overhead.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" a person having ordinary skill in the art will appreciate how the features of this invention provide advantages that include decreasing the size of control frames.

One aspect of the disclosure provides a method of wireless communication. The method comprises generating a control frame comprising a contention free end (CF-end) frame, the CF-end frame comprising a physical layer preamble having a type field, the type field including an indicator indicating the CF-end frame is a null data packet (NDP). The method further includes transmitting the control frame.

Another aspect of the disclosure provides a wireless device comprising a processor configured to generate a control frame comprising a contention free end (CF-end) frame, the CF-end frame comprising a physical layer preamble having a type field, the type field including an indicator indicating the CF-end frame is a null data packet (NDP). The wireless device further comprises a transmitter configured to transmit the control frame.

Another aspect of the disclosure provides a method of wireless communication. The method comprises generating a control frame comprising a null data packet acknowledgement (NDP ACK) frame or NDP modified ACK frame, the NDP ACK frame or NDP modified ACK frame comprising a duration indication field, wherein the duration indication field provides signaling information for the NDP ACK or the NDP modified ACK. The method further includes transmitting the control frame.

Another aspect of the disclosure provides a wireless device comprising a processor configured to generate a control frame comprising a null data packet acknowledgement (NDP ACK) frame or NDP modified ACK frame, the NDP ACK frame or NDP modified ACK frame comprising a duration indication field, wherein the duration indication field provides signaling information for the NDP ACK or the NDP modified ACK. The wireless device further comprises a transmitter configured to transmit the control frame.

BRIEF DESCRIPTION OF THE DRAWINGS

FIG. 6 is a table illustrating the fields that may be included in a SIG field of an example of an ACK frame.

FIG. 7 is a table illustrating the fields that may be included in a SIG field of another example of an ACK frame.

DETAILED DESCRIPTION

Figure 1:
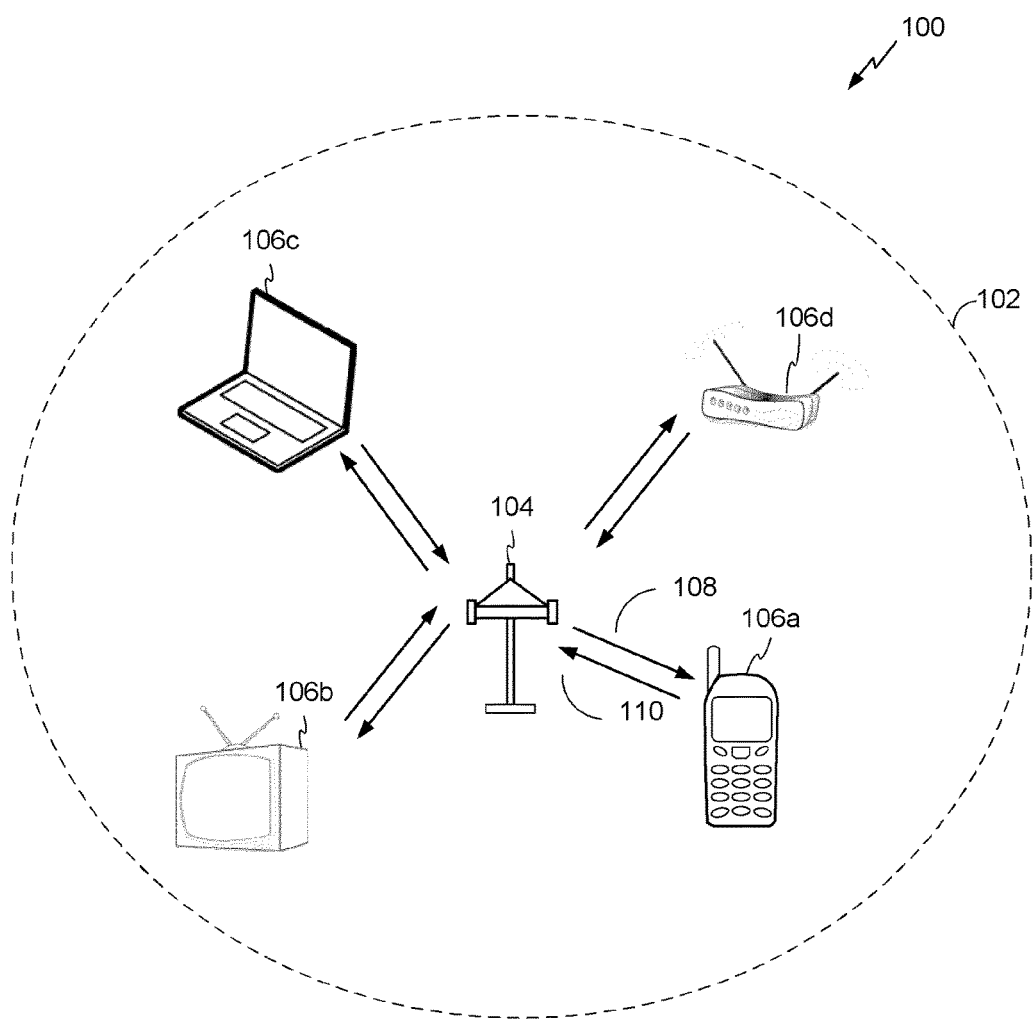
FIG. 1 illustrates an example of a wireless communication system in which aspects of the present disclosure may be employed.

Various aspects of the novel systems, apparatuses, and methods are described more fully hereinafter with reference to the accompanying drawings. The teachings in this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11 ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104, along with the STAs 106 that are associated with the AP 104, may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
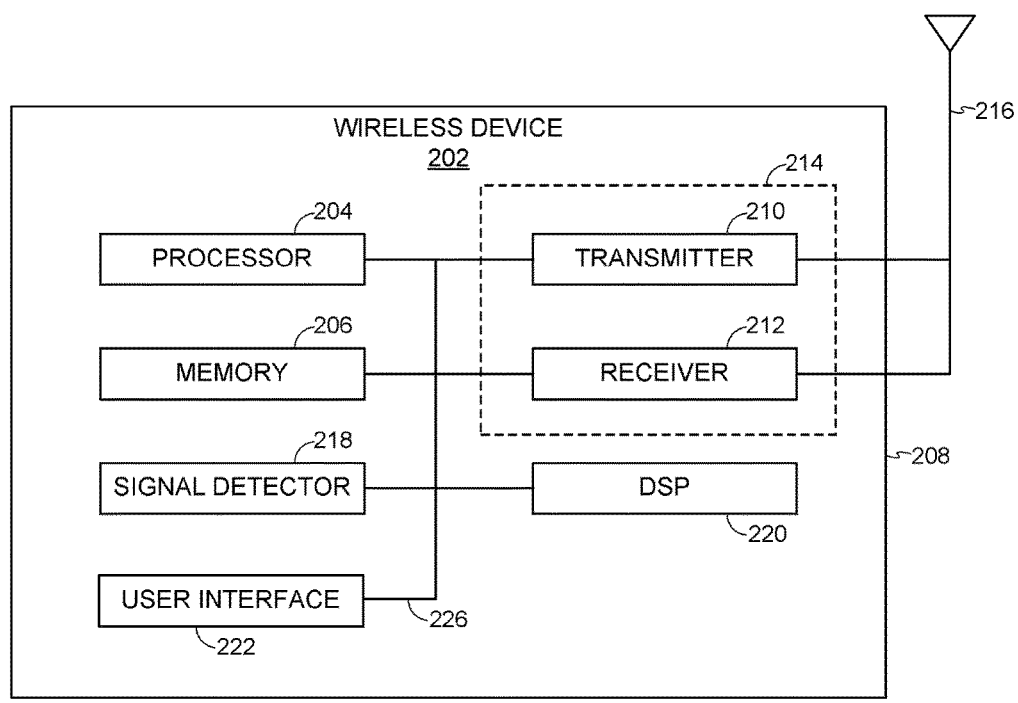
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those skilled in the art will appreciate the components of the wireless device 202 may be coupled together or accept or provide inputs to each other using some other mechanism.

Although a number of separate components are illustrated in FIG. 2, those skilled in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications. The communications exchanged between devices in a wireless network may include data units which may comprise packets or frames. In some aspects, the data units may include three types of frames, including data frames, control frames, and management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

As discussed above, the DSP 220 and/or the processor 204 may be configured to generate a data unit for transmission. In some aspects, the generated data unit may comprise a control frame including control information and optionally a plurality of data symbols. Control frames may be used to assist in the delivery of data frames and may be included in a medium access control (MAC) header. Control frames included in a MAC header with control information and data symbols (e.g., payload data) may cause significant overhead and increased processing latency for receiving devices. For example, control frames may include protocol information, control type information, address information, payload data, etc. In some aspect, the information included in control frames may not always be necessary for the particular use of a control frame. As such, systems, methods, and non-transitory computer-readable media are needed for generating and decoding short control frames. For example, short control frames may be generated by omitting some information from the control frame and/or by including the control frame in other packet locations, such as a physical layer (PHY) preamble. For example, the control frame may comprise a physical layer (PHY) preamble that includes a plurality of fields. The fields may include one or more training fields (e.g., a short training field (STF) and a long training field (LTF)), for example, and a signal (SIG) field. Each of the training fields may include a known sequence of bits or symbols. In some aspects, the SIG field may include information about the data unit, for example a description of a length or data rate of the data unit (e.g., a LENGTH field, a modulation coding scheme (MCS) field, a bandwidth (BW) field, etc.). In some aspects, short control frames may be generated by encoding control frames in the SIG field of the PHY preamble.

Figure 3:
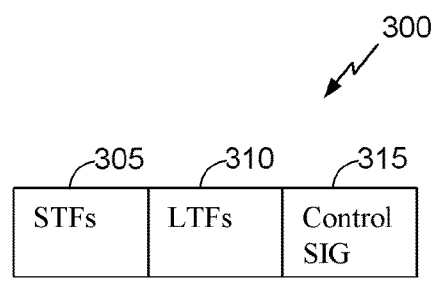
FIG. 3 illustrates an example of a control frame that may be generated and communicated in the system of FIG. 1.

FIG. 3 illustrates an example of a control frame 300 that may be generated and communicated in the system of FIG. 1. As shown, the control frame 300 includes an STF field 305, and LTF field 310, and a control SIG field 315. For example, the control frame 300 may be a PHY preamble. In some aspects, the PHY preamble may comprise a physical layer convergence protocol (PLCP) layer, as defined in the IEEE 802.11 specifications. The STF field 305 includes one or more STFs. The LTF field 310 includes one or more LTFs. The control information for the control frame 300 may be included in the SIG field 315. Further, in some aspects, the control frame may not include any additional fields or data (e.g., payload). As a result, network overhead may be reduced and throughput and processing of data packets may be increased.

Figure 4:
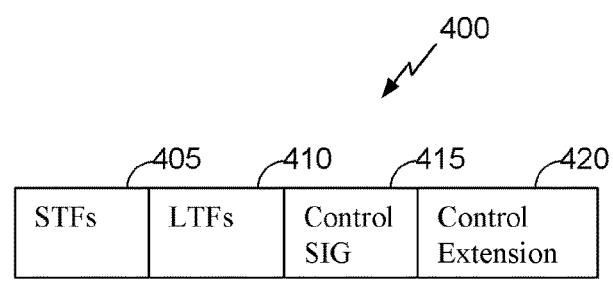
FIG. 4 illustrates another example of a control frame that may be generated and communicated in the system of FIG. 1.

FIG. 4 illustrates another example of a control frame 400 that may be generated and communicated in the system of FIG. 1. As shown, the control frame 400 includes an STF field 405, and LTF field 410, a control SIG field 415, and a control extension field 420. Similar to the control frame 300, the STF field 405 includes one or more STFs and the LTF field 410 includes one or more LTFs. Further, similar to the control frame 300, the control information for the control frame 400 may be included in the SIG field 415. However, unlike the control frame 300, additional control information may be included in the control extension field 420. For example, the PHY preamble of the control frame 400 may comprise the STF field 405, LTF field 410, and control SIG field 415. However, there may be additional control information that does not fit in the PHY preamble of the control frame 400. Accordingly, the additional control information may be included in the control extension field 420 which may be located in a portion (e.g., a few symbols) of a data portion of the control frame 400. The control extension field 420 of the control frame 400 may be sent with a default MCS that may be predetermined or negotiated in a different message (e.g., at association or in beacons) between the transmitter and the receiver. In one aspect, the MCS of the control extension field 420 may be indicated in the SIG field 415. Both control frame 300 and control frame 400 may be used for communication. For example, control frame 300 may be utilized where the control information fits in the SIG field 315. Further, control frame 400 may be utilized where the control information does not fit in the SIG field 315. In some aspects, the LENGTH field of the SIG field may further indicate whether or not the control extension field is included in a control frame.

Figure 5:
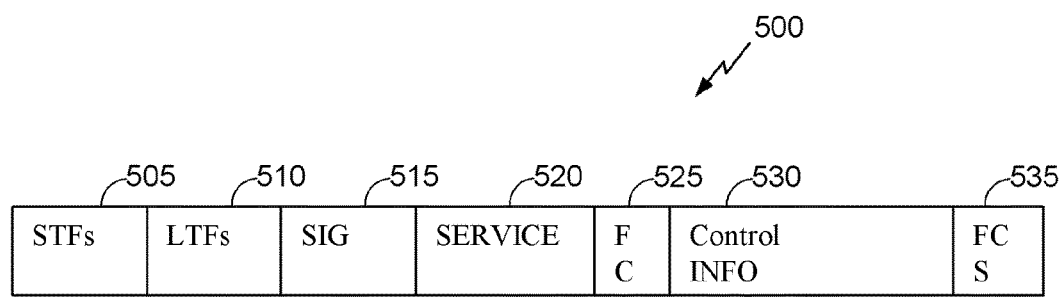
FIG. 5 illustrates another example of a control frame that may be generated and communicated in the system of FIG. 1.

FIG. 5 illustrates another example of a control frame 500 that may be generated and communicated in the system of FIG. 1. As shown, the control frame 500 includes an STF field 505, and LTF field 510, a SIG field 515, a SERVICE field 520, a frame control (FC) field 525, a control information (INFO) field 530, and a frame check sequence (FCS) field 535. The control information of the control frame 500 may be included in the control INFO field 530.

The type of control information included in any of the above control frames 300, 400, and 500 (or any other suitable control frame) may be dependent on the type of control frame. For example, various different control frames may be generated and communicated by wireless devices 202. Different types of control frames used in the wireless system of FIG. 1 may include one or more of the following control frame types: acknowledgment (ACK), power save poll (PS-poll), request to send (RTS), clear to send (CTS), block ACK request (BAR), block ACK (BA), contention free-end (CF-end), CF-end poll, MCS request, MCS response, NULL data packet (NDP), probe request, and probe response. The control information may comprise fields of information. Different control frame types may comprise different fields of information. The various fields of information that may be included in the different types of control frames are described herein. It should be noted that the fields described below do not necessarily need to be included in the control frame in the same order as described. Rather, the fields may be included in any order or any portion of the control frame where control information is included (e.g., SIG field, control extension field, control field, etc.). For example, the fields may be ordered by priority. The order of the fields for a given control frame type may be predetermined (e.g., programmed at manufacture of the device or upon initialization of the device, communicated in a separate message between wireless devices 202), however, such that the wireless devices 202 has information regarding which bits in the control frame correspond to which fields.

In some aspects, certain fields may be included in all control frames, regardless of the type. For example, in some aspects, a type field may be included in all the control frames, where the type field identifies the type of the control frame. The type field may be, for example, 2, 3 or 4 bits long. Interpretation of the remaining bits (e.g., determination of which bits correspond to which fields and which fields are included) in the control frame may be based on the type of the control frame and whether the frame is even a control frame. For example, in some aspects, a value of 0 of a LENGTH field of a SIG field of the frame may indicate that the frame is a short control frame such as the control frame 300 or 400. If the LENGTH field has a different value it may indicate the frame is of a different type (e.g., a data frame, a management frame, or a different type of control frame). The SIG field may further include a type field which then indicates the type of control frame. In some other aspects, any value less than a particular value (e.g., 10) of the LENGTH field of a SIG field of the frame may indicate that the frame is a control frame, such as the control frame 300 or 400. Further, the type of control frame may be based on the value of the LENGTH field, meaning each value 0-10 may be associated with a different control frame type. In some other aspects, a 1-bit type field (type indication field) may be added to the frames in general that indicates whether or not the frame is a control frame (or in particular a short format control frame), such as the control frame 300 or 400, or not (e.g., a data frame, a management frame, or a different type of control frame) depending on the value of the bit. In some aspects, a 1 bit type indication field may indicate that the short format control frame is a null data packet (NDP) that may be located in a physical layer (PHY) preamble and may omit a MAC header field, a FCS, or a service field. The remaining bits of the type field may indicate the type of control frame (i.e. acknowledgment (ACK), power save poll (PS-poll), request to send (RTS), clear to send (CTS), block ACK request (BAR), block ACK (BA), contention free-end (CF-end), CF-end poll, etc.). In some other aspects, one or more reserved values of fields that are defined in frames may be used to indicate if the frame is a control frame (or in particular a short format control frame), such as the control frame 300 or 400, or not (e.g., a data frame, a management frame, or a different type of control frame). For example, one or more reserved values of the MCS field in the SIG field could be used to indicate if the frame is a control frame and/or the type of control frame. In this case, a further field indicating the type may not be needed. For example, an unused value of a space-time block codes (STBC) field may be used. Multiple fields may also be used in combination to identify the control frame. LENGTH and MCS may also be used in combination to indicate the type of control frame. For example, the LENGTH field may have a value (e.g., 0) that may indicate the frame is of a certain type (e.g., NDP), while a different value of the LENGTH field (e.g., LENGTH>0) may indicate that the type of control frame is indicated by the MCS.

Similarly a 1-bit type field may be used in combination with the LENGTH field to indicate the type of control frame. For example, a value (e.g., 0) of a 1-bit type field may indicate that the frame is a control frame of a type other than a certain type (e.g., NDP). Further, another value (e.g., 1) of the 1-bit type field may indicate that the frame is of the certain type (e.g., NDP) if the LENGTH field has a certain value (e.g., 0), or not a control frame if the LENGTH field has a different value (e.g., LENGTH>0).

Further, in some aspects, a cyclic redundancy check (CRC) field may be included in all types of control frames. The CRC field may be used to validate the frame is correctly received. The CRC may be, for example, 4 or 5 bits long. Further, in some aspects, a transmit (TX) power indication may be included in all types of control frames. The TX power indication may be used by a receiver of the control frame to estimate pathloss or change behavior of the receiver based on the TX power of the transmitter of the control frame.

Further, in some aspects, a non-valid combination of values in one or more fields within the SIG field may be used to indicate whether the frame is a control frame. For example, a coding field may include two subfields (e.g., one bit each). A first subfield of the coding field may indicate the coding type (e.g., binary convolutional coding (BCC) or low density parity check (LDPC) coding). A second subfield of the coding field may indicate how to compute the length of the frame. For example, the second subfield may be set to 0 when the first subfield indicates a BCC coding type. A value of 01 in the coding field is not valid for normal non-control frames, thus the value 01 can be used to indicate that the frame is a control frame. Similar procedures may apply to other fields or combination of fields in the SIG field. Further, a short control frame will include a type field that identifies the type of control frame.

In some aspects, the control frame may be sent with a PHY preamble that occupies a 1 MHz bandwidth or a bandwidth greater than or equal to 2 MHz. The bandwidth of the frame may be implicitly determined from the PHY preamble structure. For example, the STF and/or LTF of the PHY preamble may be used to determine whether the bandwidth of the frame is 1 MHz or greater than or equal to 2 MHz.

In some aspects, the control frame may be replicated across multiple 1 MHz bandwidth channels or across multiple bandwidth channels that are greater than or equal to 2 MHz, e.g. multiple copies of the control frame may be sent on multiple channels, which may or may not be adjacent. A receiver of such a control frame may determine the number of channels the frame may be replicated on. In one aspect, the info field or the SIG field of the PHY preamble of the control frame may include an indication of the bandwidth or total number of channels on which the frame is replicated. For example, 2-bits of the info field or the SIG field may be used as follows:

00: frame is not replicated
    01: replicated on 2 channels
    10: replicated on 4 channels
    11: replicated on 8 channels
    where the 'channel' may be a 1 MHz bandwidth channel or a bandwidth channel that is greater than or equal to 2 MHz depending on whether the frame is a 1 MHz bandwidth frame or a bandwidth frame that is greater than or equal to 2 MHz.

In some aspects, one type of control frame is an ACK. For example, the STA 106a may send data to the AP 104. Upon successful receipt of the data, the AP 104 may send an ACK to the STA 106a indicating successful receipt of the data to the STA 106a. In some aspects, the ACK may be sent in response to successful receipt of at least one of the following: a data frame, a management frame, a control frame, a PS-Poll, or another type of frame. In one aspect, the control information of an ACK may consist of, or consist essentially of, one or more of the fields described above as being included in all types of control frames (e.g., type field, CRC, TX power, etc.) and one or more of the following fields: an address, an identifier of a packet being acknowledged, an indication for rate control, an indication of buffered data, a duration, and a Doppler indication. In one aspect, the duration field may be 9 bits or less and can be used to update the network allocation vector (NAV). In another aspect, the ACK may be sent as a response to trigger frames, e.g., PS-poll or QoS (quality of service) null, in which case the duration field may indicate the data delivery time of the buffered units that the AP has available for that particular STA. In some aspects, the duration may be expressed in microseconds or in multiples of a time unit (e.g., the time slot or a pre-defined value for which the AP and the STA agree during association, re-association, or sent with management frames). The control information (e.g., the INFO field, control info field, etc.) of the ACK may not include any additional fields.

In some aspects, the duration may indicate a time delay rather than NAV setting. In such implementations, the duration may be expressed in microseconds (or as a multiple of another time unit, e.g., ms) and it may indicate to a first STA that sent a trigger frame (the frame that triggered a second STA to transmit a null data packet (NDP) ACK frame) that the first STA should not send any further data to the second STA for the amount of time indicated in the duration field of the NDP ACK frame. In one embodiment, the way a STA interprets the duration field may depend on a value of a duration indication bit. As an example, if the duration indication is set to 0, the duration field indicates a NAV duration, while if it is set to 1, it indicates a time delay during which the STA should not access the medium as described above. In another embodiment, the type of the NDP frame may implicitly indicate how a STA should interpret the duration field. In one embodiment, the reason for postponing access to the medium for the STA receiving the ACK, may be to notify it that the STA that generated the NDP ACK frame is encountering some problems in delivering the following frames to a destination. As an example, a Relay STA (AP) may indicate to the associated STA that its buffers are full and the Relay cannot store anymore packets in the transmit buffer. In another embodiment, the AP/Relay/STA may use this duration indication for other purposes such as entering a power save mode for that duration, or to indicate that it cannot process any more data for that duration, etc. In one embodiment, the NDP ACK may include one or more bits specifying the reason the STA should delay transmitting for the period of time indicated in the duration field of the NDP ACK frame. In some implementations, the indication of the duration in the NDP ACK frame may be used by other STAs associated to that same AP/Relay STA to behave the same as the intended receiver of the ACK frame such that they may defer accessing the medium to send packets to the AP/Relay STA for that duration of time. In one embodiment, this functionality of the NDP ACK can be obtained in a similar way by using other types of NDP frames, such as NDP SID, NDP Modified ACK or NDP CTS frames.

In some aspects, the address field of the ACK may include one or more global addresses (e.g., a MAC address, BSSID) that uniquely identifies a transmitter and/or a receiver of the ACK globally (e.g., in a network). In some aspects, the address field may include one or more local addresses (e.g., an association identifier (AID)) that uniquely identifies a transmitter and/or receiver of the ACK locally (e.g., in a local network such as in a particular BSS). In some aspects, the address field may include a partial or non-unique identifier (e.g., a portion of a MAC address or AID) that identifies a transmitter and/or receiver of the ACK. For example, the address field of the ACK may comprise at least a portion of the AID or MAC address of the transmitter and/or receiver of the ACK. The at least a portion of the AID or MAC address may be copied from the frame being acknowledged by the ACK.

In some aspects, the identifier field of the ACK may identify the frame being acknowledged (e.g., one or more MAC protocol data units (MPDUs)). For example, in one aspect, the identifier field may be a hash of the content of the frame. In another aspect, the identifier field may include at least a portion of the CRC (e.g., the FCS field) of the frame. In another aspect, the identifier field may be based on at least a portion of the CRC (e.g., the FCS field) of the frame and at least a portion of a local address (e.g., AID of an STA). In another aspect, the identifier field may be a sequence number of the frame. In another aspect, the identifier field may be computed based on one or more of the following in any combination: a global address of the transmitter/receiver of the ACK, a local address of the transmitter/receiver of the ACK, a portion of a global address of the transmitter/receiver of the ACK, a portion of a local address of the transmitter/receiver of the ACK, a sequence number (or a portion of the sequence number) of one of the MPDUs being acknowledged, a portion of the CRC (e.g., the FCS field) of the frame being acknowledged, or a portion of a scrambling seed of the frame being acknowledged. For example, in one aspect, the identifier field may include a hash of a global address (e.g., BSSID, MAC address of an AP) and a local address (e.g., AID of an STA).

$$(\mathrm{dec}(\mathrm{AID}[0{:}8]) + \mathrm{dec}(\mathrm{BSSID}[44{:}47] \mathrm{XOR}\ \mathrm{BSSID}[40{:}43]) 2\char`\^5) \bmod 2\char`\^9 \qquad (1)$$

where dec( ) is a function that converts a hexadecimal number to a decimal number.

In another aspect, the identifier field of the ACK may include a combination of a portion of the FCS of the frame being acknowledged and the scrambling seed or value found in the SERVICE field of the frame, or sequence number of the frame. For example, the combination may comprise a sum operation or a copy operation of some bits of the FCS and scrambling seed into some bits of the ACK identifier. In some aspects, the identifier included in the ACK may be different depending on the type/subtype of the frame. As an example, if the frame being acknowledged is a data frame or management frame, the identifier may be based on the sequence number of the MPDU in the frame, or it may be any other identifier described herein provided the necessary information is present in the data or management packet. If the frame is a control frame (e.g. a PS-Poll), the frame may not have a sequence number and hence in this case the identifier may be based on the FCS of the PS-Poll frames, the PS-Poll identifier or on a token number or any other identifier described herein for which the control frame provides the necessary information.

In some aspects, the identifier included in the ACK may be different depending on the type/subtype of the frame being acknowledged. As an example, if the frame is a data or management frame, the identifier may be based on a combination of a partial sequence number of the MPDU in the frame and any other identifier described herein provided the necessary information is present in the data or management packet. The length of the partial sequence number included in the ACK ID may be a function of the maximum number of MPDUs that a Block ACK frame can acknowledge. As an example, a partial sequence number of 6 bits in length is sufficient to distinguish among multiples of blocks of 64 MPDUs. In this aspect, the ACK frame may be able to perform Block ACK functionalities.

As an example, if the frame is a control frame (e.g. a PS-Poll), the frame does not have a sequence number and hence in this case the identifier may be based on the FCS of the PS-Poll frames, on a token number, or any other identifier described herein for which the control frame provides the necessary information. As an additional example, if the ACK is sent as a response to a PS-Poll control frame that is defined based on the concepts described herein, the ACK identifier may be the same as the PS-Poll identifier.

In some aspects, the identifier field of the ACK includes one or more of the least significant bits of the receiver address (e.g., address 1) of the frame being acknowledge. The receiver address in the frame could be a full MAC address or a local address (AID) depending on the frame format. In some aspects, the identifier field of the ACK includes one or more of the least significant bits of the receiver address combined (e.g., summed with some other computation with) a scrambling seed (or a portion of the scrambling seed) from the SERVICE field of the soliciting frame.

In some aspects, the identifier field of the ACK is the last one or more bits of the frame being acknowledged. It should be noted that any of the above discussed examples for the identifier field of the ACK may be included with any suitable short control frame such as those described herein and in response to any type of frame.

In some aspects, the frame for which the ACK is sent in response may include a token number set by the transmitter of the frame. The transmitter of the frame may generate the token number based on an algorithm. In some aspects, the token number generated by the transmitter may have a different value for each frame sent by the transmitter. In such aspects, the receiver of the frame may use the token number in the identifier field of the ACK to identify the frame being acknowledged such as by setting the identifier as the token number or computing the identifier based at least in part on the token number. In some aspects, the identifier field may be computed as a combination of the token number with at least one of the following: a global addresses of the transmitter/receiver of the ACK, a local addresses of the transmitter/receiver of the ACK, a portion of global addresses of the transmitter/receiver of the ACK, a portion of local addresses of the transmitter/receiver of the ACK, or a portion of a CRC of the frame.

In some other aspects, the token number may be included in another field of the ACK and/or frame being acknowledged such as a SIG field and/or a control information (Control Info) field. In some aspects, the token may be derived from a scrambling seed in a SERVICE field, which may come after a PHY preamble, of the frame being acknowledged.

In some aspects, an indication of rate control field of the ACK may include one or more bits that indicate the MCS that the receiver of the frame (the transmitter of the ACK) suggests that the transmitter of the frame should use. For example, in one aspect, the value of the one or more bits may indicate that the MCS should either be lowered, raised, or stay the same and may indicate by how much the MCS should change. In another aspect, the value of the one or more bits may indicate a specific MCS. The frame may further include a number of spatial streams indication, which indicates the number of spatial streams used to transmit the frame.

In some aspects, an indication of buffered data indicates that the transmitter of the ACK has data buffered and ready to be sent to a receiver of the ACK. For example, a STA 106a may poll the AP 104 (such as through a PS-poll message) to determine whether the AP 104 has data buffered to send to the STA 106a. The AP 104 may therefore respond with an ACK having an indication of buffered data field acknowledging successful receipt of the poll, and where the value of the field indicates whether the AP 104 has data buffered or not.

FIG. 6 is a table illustrating the fields that may be included in a SIG field of an example of an ACK frame. In the illustrated aspect, the SIG field consists or consists only of a control field 605 of 1 bit, a type field 610 of 3 bits, an address/identifier field 615 of 13 bits for an AID or 32 bits for an FCS or 40 bits for a partial MAC address, a rate adaptation information field 620 of 1-4 bits, a CRC field 625 of 4 bits, and a tail field 630 of 6 bits. The control field 605 indicates if the frame is a control frame as described above. The type field 610 defines the type of the frame as described above. The address/identifier field 615 corresponds to one of the address field or identifier field as described above. The rate adaptation information field 620 corresponds to the indication of rate control field as described above. The CRC field 625 corresponds to a CRC of the ACK frame. The tail field 630 corresponds to information needed by the PHY layer to decode the ACK frame.

FIG. 7 is a table illustrating the fields that may be included in a SIG field of another example of an ACK frame. In the illustrated aspect, the SIG field consists or consists only of a length field 705 of 12 or 9 bits, optionally (depending on whether the length field indicates the type as discussed above) a type field 710, an address/identifier field 715 of 13 bits for an AID or 32 bits for an FCS or 40 bits for a partial MAC address, a CRC field 725 of 4 bits, and a tail field 730 of 6 bits. The length field 705 corresponds to the length field described above. The type field 710 defines the type of the frame as described above. The address/identifier field 715 corresponds to one of the address field or identifier field as described above. The CRC field 725 corresponds to a CRC of the ACK frame. The tail field 730 corresponds to information needed by the PHY layer to decode the ACK frame.

Figure 8:
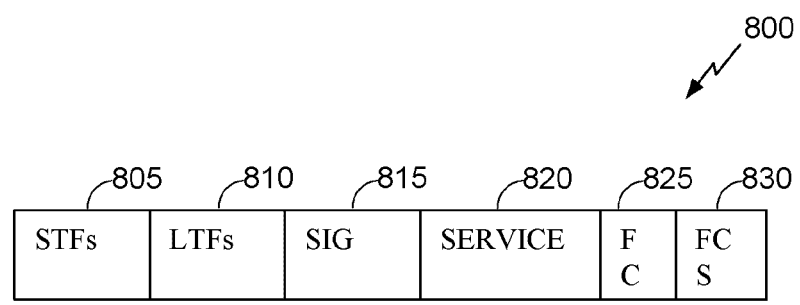
FIG. 8 illustrates another example of an ACK frame with a format similar to the control frame of FIG. 5.

FIG. 8 illustrates another example of an ACK frame with a format similar to the control frame of FIG. 5. As shown, the ACK frame 800 comprises an STF field 805, and LTF field 810, a SIG field 815, a SERVICE field 820, a FC field 825, and a FCS field 830. In this embodiment, no control information may be included in the ACK frame. Rather, the FCS field 830 may be modified to indicate the frame is an ACK frame. In particular, the FCS field 830, instead of including a CRC of the ACK frame 800, may include a copy of the FCS of the frame being acknowledged. A recipient of the ACK frame 800 may determine the frame is an ACK frame 800 if it sent a frame with the same FCS. In some aspects, the transmitter of the frame may expect the ACK frame 800 within a particular time interval and therefore may only check if incoming packets have the copied FCS for that time interval. Further, in some aspects, the FC field 825 may include an indicator that indicates whether or not the frame is an ACK.

Figure 14:
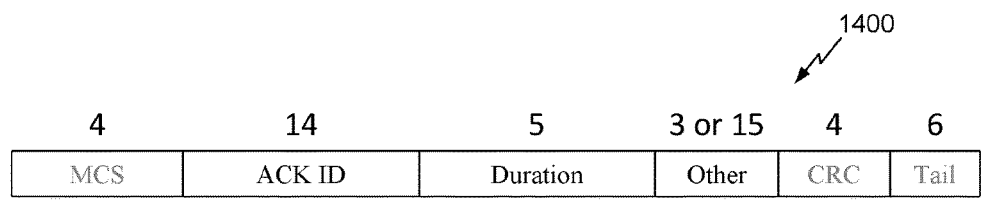
FIG. 14 illustrates an example of an ACK frame.

FIG. 14 illustrates another example of an ACK frame 1400 according to the teachings herein. As shown, the ACK frame 1400 includes a MCS of 4 bits (that indicates the type of control frame), an ACK ID of 14 bits (that may consist of a partial FCS and scrambler seed), a duration of 5 bits, an other field of 3 or 15 bits, a cyclic redundancy check of 4 bits and a tail of 6 bits.

In some aspects, a method of wireless communication comprises generating an acknowledgment frame comprising control information consisting essentially of the following: one or more of a length field, a cyclic redundancy check field, and a transmit power indication field; and one or more of an address field, an identifier field, an indication for rate control field, and an indication of buffered data field. The method further comprises transmitting the acknowledgment frame. In some aspects, the address field includes one of a global address or a local address. In some aspects, the address field includes one of an address of a transmitter of the acknowledgment frame or a receiver of the acknowledgment frame.

In some aspects, the identifier field includes one of a hash of a packet being acknowledged, a cyclic redundancy check of the packet being acknowledged, a token, or a sequence number of the packet being acknowledged.

In some aspects, the indication for rate control field indicates an amount to change a modulation coding scheme. In some aspects, the indication for rate control field indicates a modulation coding scheme.

In some aspects, the acknowledgement frame comprises information based on at least a frame check sequence of a packet being acknowledged. In some aspects, the information based at least on the frame check sequence comprises an identifier based on the frame check sequence and one or more of the following: a scrambling seed from a service field of the packet being acknowledged and a sequence number from the packet being acknowledged. In some aspects, the information is based on a type of the packet being acknowledged.

In some aspects, one type of control frame is a PS-poll. For example, the STA 106a may send a PS-poll to the AP 104 to determine whether the AP 104 has data to send to the STA 106a. In one aspect, the control information of a PS-poll may consist of or consist essentially of one or more of the fields described above as being included in all types of control frames (e.g., type field, CRC, TX power, etc.) and one or more of the following fields: a global address of the receiver of the PS-poll, a local address of a sender of the PS-poll, an information field, and a field indicating a token number. As discussed above, the token number may be generated by the transmitter of the PS-poll (e.g., according to an algorithm) and may have a different value for each PS-poll sent by the transmitter. The control information of the PS-poll may not include any additional fields. The information field may include the latest beacon version of that the sender of the PS-poll has received so the receiver of the PS-poll can compare the sender's version to the actual version. In another aspect, the information field may include one or more of the following in any combination: a global address of the transmitter/receiver of the PS-poll, a local address of the transmitter/receiver of the PS-poll, a portion of a global address of the transmitter/receiver of the PS-poll, a portion of a local address of the transmitter/receiver of the PS-poll, or the scrambler seed (or a portion of the scramble seed) of the beacon that carries the traffic indication map (TIM) for which the PS-poll is being sent. For example, the information field may include, in any order, a BSSID of an AP and an AID of an STA. If there is a mismatch between the sender's version and the actual version, the receiver of the PS-poll can send new information to the sender of the PS-poll.

In some aspects, the control information of the PS-poll may include an identifier. The identifier value may be set to the same value of, or to a value derived from, a corresponding identifier (e.g., scrambler seed) included in a beacon (e.g., latest received beacon) or other paging frame received by the STA 106a from the AP 104. When the identifier is present, the receiver address of the PS-Poll may be omitted from the frame, since the identifier identifies the intended receiver. Furthermore, the PS-Poll may include a part of its AID (e.g., 11 LSBs of its AID) in the PS-Poll identifier. Further, the sender of the beacon or paging message can change the identifier for any given beacon, providing diversity across time.

Figure 13:
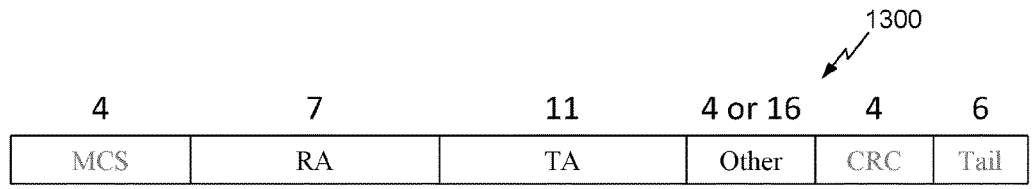
FIG. 13 illustrates an example of a PS-poll frame.

FIG. 13 illustrates an example of a PS-poll control frame 1300 including a MCS of 4 bits (that indicates the type of control frame), a receiver address of 7 bits, a transmitter address of 11 bits, an other field of 4 or 16 bits, a cyclic redundancy check of 4 bits and a tail of 6 bits.

In some aspects, PS-poll frames may be used in conjunction with ACK frames as follows. A STA may send a PS-poll intended for an AP with which the STA is associated. Upon receipt of the PS-poll, the AP may respond with an ACK frame, such as those described herein. For example, the ACK frame may include an identifier computed based on a token number included in the PS-poll frame as described above. The token may be the PS-Poll identifier. Using the token number in responses beneficially allows the identifier of the ACK to be different for each PS-poll, thereby allowing a device to easily differentiate between multiple ACKs if multiple ACKS are received by the device at the same time. In another example, the ACK frame may include one or more of the following in any combination: a global address of the transmitter/receiver of the PS-poll, a local address of the transmitter/receiver of the PS-poll, a portion of a global address of the transmitter/receiver of the PS-poll, or a portion of a local address of the transmitter/receiver of the PS-poll, which may be copied from the PS-poll.

In some aspects, a method of wireless communication comprises generating a power save poll frame comprising control information consisting essentially of the following: one or more of a length field, a cyclic redundancy check field, a transmit power indication field, a destination address field, a transmitter address field, and an information field. The method further comprises transmitting the power save poll frame. In some aspects, the information field includes a beacon version. In some aspects, the destination address field comprises a global address and the transmitter address field comprises a local address. In some aspects, the information field includes an identifier based on a received beacon.

In some aspects, one type of control frame is a RTS. In one aspect, the control information of a RTS may consist of or consist essentially of one or more of the fields described above as being included in all types of control frames (e.g., type field, CRC, TX power, etc.) and one or more of the following fields: a global address of the receiver of the RTS, a local address of a sender of the RTS, and a duration field. The control information of the RTS may not include any additional fields. In some aspects, the RTS may additionally or alternatively include a transmit power indication (along with the one or more of the fields described above as being included in all types of control frames) which can be expressed in dB or in classes (e.g., 2 bits can indicate 4 classes of transmit powers). Furthermore, the RTS may additionally or alternatively include a bandwidth indication (along with the one or more of the fields described above as being included in all types of control frames). In one aspect, the bandwidth indication may be present only for 2 MHz (or more) control frames. The duration field may indicate the duration for which the RTS reserves a communication channel. In one aspect, the duration field may indicate the duration in 2 bytes (or less) and express duration in µs. In another aspect, the duration may indicate the duration in other time intervals (e.g., number of symbols, multiples of 40 µs, number of time slots, etc.). As an example, with a duration field length of 9 bits and expressed as multiples of 40 us the duration field can indicate up to 20.5 ms. In some aspects, the length of the time interval is declared by the AP 104 and sent in another message such as a beacon or during association to the STA 106a.

In some aspects, a method of wireless communication comprises generating a request to send frame comprising control information consisting essentially of the following: one or more of a length field, a cyclic redundancy check field, a transmit power indication field, a destination address field, a transmitter address field, and a duration field. The method further comprises transmitting the request to send frame. In some aspects, the destination address field comprises a global address and the transmitter address field comprises a local address. In some aspects, the duration field expresses duration in multiples of symbols.

Figure 15:
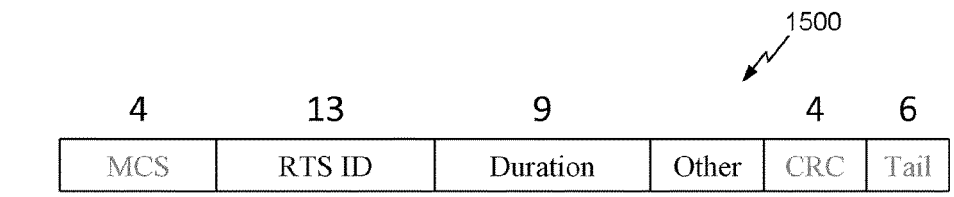
FIG. 15 illustrates an example of a RTS frame.

FIG. 15 illustrates an example of a RTS control frame 1500 including a MCS of 4 bits (that indicates the type of control frame), a RTS ID of 13 bits (e.g., the receivers AID), a duration field of 9 bits, an other field, a cyclic redundancy check of 4 bits and a tail of 6 bits. The RTS 1500 may additionally include a bandwidth indication of 2 bits and/or may additionally include a transmit power class of 2 bits.

In some aspects, one type of control frame is a CTS. In one aspect, the control information of a CTS may consist of or consist essentially of one or more of the fields described above as being included in all types of control frames (e.g., type field, CRC, TX power, etc.) and one or more of the following fields: a local address of a sender of the RTS for which the CTS is being sent and a duration field. The local address and duration field may be copied (or derived) from the RTS for which the CTS is being sent. In some embodiments, the CTS identifier may be 9 bits long and may consist of the concatenation of the 3 least significant bits of the FCS and the 6 most significant bits of the Service field of the RTS frame. Alternatively, the CTS may not include an address copied from the RTS and instead may include an identifier, defined in similar ways as for the ACK frame discussed above. The control information of the CTS may not include any additional fields. Alternatively, the CTS may include the additional fields described previously for the RTS frame.

Figure 16:
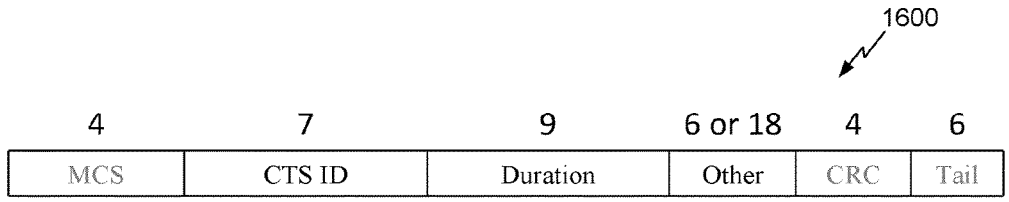
FIG. 16 illustrates an example of a CTS frame.

FIG. 16 illustrates an example of a CTS control frame 1600 including a MCS of 4 bits (that indicates the type of control frame), a CTS ID of 7 bits (e.g., partial fcs and scrambler seed information from RTS and/or partial transmitter address of the transmitter if CTS is transmitted to self and/or a copy (or a part) of the RTS ID), a duration field of 9 bits, an other field of 6 or 18 bits, a cyclic redundancy check of 4 bits and a tail of 6 bits. The CTS 1600 may additionally include a bandwidth indication of 2 or 3 bits and/or may additionally include a transmit power class of 2 bits.

In some aspects, the CTS control frame 1600 may further include an MCS field including one or more bits indicating a suggested MCS for data transmission, which may be used, for example, to implement fast link adaptation. For example, upon reception of a RTS frame from a second STA, a first STA may transmit the CTS control frame 1600 and use the MCS field the frame 1600 to indicate to the second STA a suggested MCS that the second STA may use for the following data transmission to it. The second STA may choose the MCS indicated in the MCS field in order to select the MCS for the following data transmission.

In some aspects, the MCS field may indicate an MCS index, according to the MCS definition in the IEEE standard. In some aspects, the MCS field may include a relative MCS, including an indication to increase or decrease the MCS with respect to a given reference MCS. For example, the reference MCS may be an MCS used for the transmission of the soliciting RTS. As another example, the reference MCS may be an MCS explicitly indicated in a field of the soliciting RTS. As another example, the reference MCS may be an MCS used in the last successful data transmission. In some aspects, the CTS may further include an indication that the sender of the CTS has buffered data units or frames ready to be delivered to the recipient of the CTS.

In some aspects, the MCS field of the CTS control frame 1600 may include two bits to indicate the suggested MCS. For example, the following combination of bits may be used to indicate a suggested MCS:
  00: same MCS as RTS
  01: MCS of RTS '+1'
  10: MCS of RTS '+2'
  11: MCS of RTS '+3'
  As another example, if the RTS frame is sent at MCS2 rep 2, then:
  00: MCS0 rep2
  01: MCS0
  10: MCS1
  11: MCS2

In some aspects, the CTS control frame 1600 may include 1 bit used to indicate that the CTS is a response to the RTS but it is not granting the transmission opportunity (TXOP) to the STA. For example, the CTS control frame 1600 may indicate that the RTS was received, but the network allocation vector (NAV) is not set and the transmitter of the RTS is not granted the possibility to send data after the CTS. In some aspects, if the CTS control frame 1600 indicates that it is not granting the TXOP, a duration field of the CTS control frame 1600 is not used to indicate the NAV duration. In such aspects, the duration field may be used to indicate a time after which the STA is allowed to send another RTS frame or data.

In some aspects, a method of wireless communication comprises generating a clear to send frame comprising control information consisting essentially of the following: one or more of a length field, a cyclic redundancy check field, a transmit power indication field, a destination address field and a duration field. The method further comprises transmitting the clear to send frame. In some aspects, the clear to send control frame comprises a physical layer preamble having a signal field that includes the control information.

In some aspects, one type of control frame is a BAR. For example, the STA 106a may send BAR to another STA requesting the other STA to send a BA. In one aspect, the control information of a BAR may consist of or consist essentially of one or more of the fields described above as being included in all types of control frames (e.g., type field, CRC, TX power, etc.) and one or more of the following fields: a global address, a local address, an address interpretation field, a traffic identifier (TID) field, and a starting sequence number field. The control information of the BAR may not include any additional fields. The global address may be a global address of the transmitter of the BAR or the receiver of the BAR. The local address may be a local address for the other of the transmitter of the BAR and the receiver of the BAR for which a global address is not included in the BAR. The address interpretation field may be 1 or 2 bits that indicate whether the global address is the address of the transmitter and the local address is the address of the receiver or if the global address is the address of the receiver and the local address is the address of the transmitter. Since a BA is defined per TID, and a sequence number of the starting block for which the BA is requested is needed, these values are included in the BAR. The TID may be 3 bits and the starting sequence number may be 12 bits. In some aspects, the start sequence number may be a partial sequence number, such as one or more of the least or most significant bits of the start sequence number. The length of the partial sequence number may depend on the maximum number of MPDUs that a Block ACK can acknowledge. As an example, a partial Sequence Number of 6 bits in length is sufficient to distinguish among multiples of blocks of 64 MPDUs. In some aspects, the TID identifies the Access Category, and per each access category it identifies 2 sub categories, for a total of 8. In other aspects, an indication of the Access Category is sufficient. In some aspects, instead of a 3-bit TID, the control field may include a 2-bit Access Category.

In another aspect, the control information of a BAR may consist of or consist essentially of one or more of the fields described above as being included in all types of control frames (e.g., type field, CRC, TX power, etc.) and one or more of the following fields: a global address, a first local address, a second local address, a traffic identifier (TID) field, and a starting sequence number field. The control information of the BAR may not include any additional fields. The global address may indicate a BSSID of the transmitter and receiver. The first and second local addresses may be local addresses of the transmitter and receiver.

In another aspect, the control information of a BAR may consist of or consist essentially of one or more of the fields described above as being included in all types of control frames (e.g., type field, CRC, TX power, etc.) and one or more of the following fields: a first global address, a second global address, a traffic identifier (TID) field, and a starting sequence number field. The control information of the BAR may not include any additional fields. The first and second global addresses may be global addresses of the transmitter and receiver.

In some aspects, a method of wireless communication comprises generating a block acknowledgment request frame comprising control information consisting essentially of the following: one or more of a length field, a cyclic redundancy check field, a transmit power indication field, a global address field, a local address field, an address interpretation field, a traffic identifier field, and a starting sequence number field. The method further comprises transmitting the block acknowledgment request frame.

In some aspects, one type of control frame is a BA. For example, the STA 106a may send a BA to acknowledge receipt of multiple frames. In one aspect, the control information of a BA may consist of or consist essentially of one or more of the fields described above as being included in all types of control frames (e.g., type field, CRC, TX power, etc.) and one or more of the following fields: a global address, a local address, an address interpretation field, a traffic identifier (TID) field, a starting sequence number field, and a bitmap. The control information of the BA may not include any additional fields. The global address may be a global address of the transmitter of the BA or the receiver of the BA. The local address may be a local address for the other of the transmitter of the BA and the receiver of the BAR for which a global address is not included in the BA. The address interpretation field may be 1 or 2 bits that indicate whether the global address is the address of the transmitter and the local address is the address of the receiver or if the global address is the address of the receiver and the local address is the address of the transmitter. Since a BA is defined per TID, and a sequence number of the starting block for which the BA is requested is needed, these values are included in the BA. The TID may be 3 bits and the starting sequence number may be 12 bits. Further, the bitmap may be, for example, 4, 8, 16, 32, or 64 bits. The value of the bitmap may indicate which frames were successfully received and which were not received. In some aspects, any of the TID, sequence number and receiver address may be excluded from the BA as the transmitter of a BAR may expect the BA within a particular time interval from a specific responder. Therefore, if a BA is received in that time interval with the address of the transmitter, the transmitter may assume the TID and starting sequence number sent in the BAR.

In another aspect, the control information of a BA may consist of or consist essentially of one or more of the fields described above as being included in all types of control frames (e.g., type field, CRC, TX power, etc.) and one or more of the following fields: a global address, a first local address, a second local address, a traffic identifier (TID) field, a starting sequence number field, and a bitmap. The control information of the BA may not include any additional fields. The global address may indicate a BS SID of the transmitter and receiver. The first and second local addresses may be local addresses of the transmitter and receiver.

In another aspect, the control information of a BA may consist of or consist essentially of one or more of the fields described above as being included in all types of control frames (e.g., type field, CRC, TX power, etc.) and one or more of the following fields: a first global address, a second global address, a traffic identifier (TID) field, a starting sequence number field, and a bitmap. The control information of the BA may not include any additional fields. The first and second global addresses may be global addresses of the transmitter and receiver.

In another aspect, the control information of a BA may consist of or consist essentially of one or more of the fields described above as being included in all types of control frames (e.g., type field, CRC, TX power, etc.) and one or more of the following fields: a bitmap and a BA identifier. The control information of the BA may not include any additional fields. The bitmap may be a 2, 4, 8, 16, 32 bitmap indicating whether the corresponding packet was received correctly or not received. A bit in position n of the bitmap may refer to a packet with sequence number equal to n plus the sequence number indicated in the BAR frame immediately preceding the BA. In some aspects, the TID or AC value is also assumed to be the one from the immediately preceding BAR. The identifier may be defined in the same or similar ways as defined for the ACK identifier.

Figure 17:
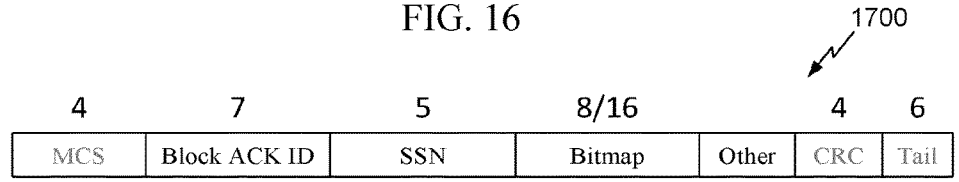
FIG. 17 illustrates an example of a block ACK frame.

FIG. 17 illustrates an example of a BA frame 1700 according to the teachings herein. As shown, the BA frame 1700 includes a MCS of 4 bits (that indicates the type of control frame), a block ACK ID of 7 bits (e.g., scrambler seed from a first MPDU or a BAR), a starting sequence number (SSN) of 5 bits (e.g., the SSN of the first MPDU acknowledged or the 5 LSB of the SSN of the first MPDU acknowledged), a bitmap of 8 bits or 16 bits, an other field, a cyclic redundancy check of 4 bits and a tail of 6 bits. In some aspects, the BA frame 1700 may include an ACK mode field of 1 bit that indicates if the BA is for block acknowledgments or fragmented acknowledgements. In some aspects, the BA frame 1700 may include a 1 bit Doppler indication field.

In some aspects, a method of wireless communication comprises generating a block acknowledgment frame comprising control information consisting essentially of the following: one or more of a length field, a cyclic redundancy check field, a transmit power indication field, a global address field, a local address field, an address interpretation field, a traffic identifier field, a starting sequence number field, and a bitmap. The method further comprises transmitting the block acknowledgment frame.

In some aspects, one type of control frame is a CF-end that is a null data packet (NDP). In one embodiment, the CF-end may be used to cancel a reservation made in response to a network allocation vector (NAV). In one aspect, the control information of a CF-end may consist of or consist essentially of a type field. The control information of the CF-end may not include any additional fields. Any receiver receiving the type field indicating CF-end may then determine any NAV should be canceled. In another aspect, the control information of a CF-end may consist of or consist essentially of a type field and one or more of the other fields described above as being included in all types of control frames (e.g., type field, CRC, TX power, etc.). The control information of the CF-end may not include any additional fields. As a result, this short format CF-end, or NDP CF-end, may reduce network overhead and may increase throughput and processing of data packets.

Figure 18:
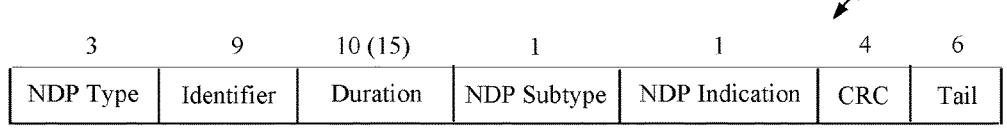
FIG. 18 illustrates an example of a NDP CF-end frame.

FIG. 18 illustrates an example of a NDP CF-end frame 1800 according to the teachings herein. As shown, the NDP CF-end frame 1800 includes a NDP type field of 3 bits (that indicates the type of control frame), an identifier field that identifies NDP CF-end of 7 or more bits, a duration field of 10 or 15 bits, a NDP subtype field of 1 bit, a NDP indication field of 1 bit that indicates whether the control frame is a NDP frame (i.e., short control frame), a cyclic redundancy check of 4 bits and a tail of 6 bits.

In some aspects, the (NDP) CF-end may have the same value of a type field (for example by using a 3 bit type field) of an NDP CTS frame and the differentiation between an NDP CF-end frame and the NDP CTS frame may be based on a subtype field (for example using 1 bit). In this embodiment, if the subtype field is set to 1 the NDP frame is a NDP CF-end. Otherwise, the NDP frame is an NDP CTS. In some aspects, the NDP CF-end may include a duration field that if present may be set by the generating STA to 0 to indicate the completion of the TXOP (i.e., set the NAV of the receiving STAs to 0). In some aspects, the STA generating the NDP CF-end frame may set the duration field of the NDP CF-end to a non-zero value, e.g., if the NDP CF-end is sent some constant time (e.g., PIFS time) after the transmission of a NDP CTS frame, the duration field of the NDP CF-end frame may be set to the same value of the duration field of the NDP CTS-Frame minus the constant time (e.g., PIFS). In this embodiment, the STA generating the NDP CF-end indicates to a group of the receiving STAs (the ones that have their NAV set to a value that equals the duration field of the CF-end) to reset their NAV value. The other STAs that have a different value of their NAV counter shall not reset their NAVs. In one embodiment, the size of the duration field size may be 10 bits in length for a 1 MHz NDP CF-end frame and 15 bits for a NDP CF-end frame that has a bandwidth greater than or equal to 2 MHz. In one embodiment, NDP CF-end frame may include an identifier for the NDP CF-end frame. The STA generating the NDP CF-end may set the identifier of the NDP CF-end to the same value as (part of) the identifier of the device (e.g., the AID or the MAC address of the STA as described in this application). In another embodiment, the identifier of the NDP CF-end may be set to the same value as the latest NAV-Setting frame that the STA transmitted immediately previously the NDP CF-end frame (e.g., a (NDP) CTS, or data frame). In one embodiment, the length of the identifier may be 9 bits and it may have the same value as an NDP CTS frame. In some aspects, a method of wireless communication comprises generating a contention-free end frame comprising control information consisting essentially of a type field. The method further comprises transmitting the CF-end frame.

In some aspects, one type of control frame is a CF-end poll. The CF-end poll may be used itself to cancel a reservation made in response to a network allocation vector (NAV) in the transmission range of the transmitter of the CF-end poll and further request a receiver of the CF-end poll to transmit a CF-end to cancel the reservation in the transmission range of the receiver of the CF-end poll. In one aspect, the control information of a CF-end poll may comprise a global address of the receiver of the CF-end poll and one or more of the fields described above as being included in all types of control frames of a type field. In another aspect, the control information of a CF-end poll may consist of or consist essentially of a global address of the receiver of the CF-end poll and one or more of the fields described above as being included in all types of control frames of a type field. In another aspect, the control information of a CF-end poll may consist of or consist essentially of a global address of the receiver of the CF-end poll and a type field indicating the frame is a CF-end poll.

In some aspects, a method of wireless communication comprises generating a contention-free end poll frame comprising control information consisting essentially of the following: one or more of a length field, a cyclic redundancy check field, a transmit power indication field, and a recipient global address field. The method further comprises transmitting the contention-free end poll frame.

In some aspects, one type of control frame is a MCS request. For example, an AP 104 may send an MCS request to the STA 106a to request from the STA 106a information as to which MCS to use for transmissions. In one aspect, the control information of a MCS request may consist of or consist essentially of one or more of the fields described above as being included in all types of control frames (e.g., type field, CRC, TX power, etc.) and one or more of the following fields: a global address of the receiver of the MCS request and a local address of a sender of the MCS request. The control information of the MCS request may not include any additional fields.

In some aspects, a method of wireless communication comprises generating a modulation coding scheme request frame comprising control information consisting essentially of the following: one or more of a length field, a cyclic redundancy check field, a transmit power indication field, a recipient global address field, and a transmitter local address field. The method further comprises transmitting the modulation coding scheme request frame.

In some aspects, one type of control frame is a MCS response. For example, an AP 104 may send an MCS request to the STA 106a to request from the STA 106a information as to which MCS to use for transmissions. In return, the STA 106a may send such information in an MCS response. In one aspect, the control information of a MCS response may consist of or consist essentially of one or more of the fields described above as being included in all types of control frames (e.g., type field, CRC, TX power, etc.) and one or more of the following fields: a local address of a sender of the MCS request for which the MCS response is sent as copied from the MCS request, a MCS field (e.g., 4 bits), and extra information (e.g., signal-to-noise ratio (SNR)). The control information of the MCS response may not include any additional fields.

In some aspects, a method of wireless communication comprises generating a modulation coding scheme response frame comprising control information consisting essentially of the following: one or more of a length field, a cyclic redundancy check field, a transmit power indication field, a recipient local address field, a modulation coding scheme field, and an information field. The method further comprises transmitting the modulation coding scheme response frame.

In some aspects, one type of control frame is a NDP. For example, an AP 104 may send an NDP to the STA 106a to allow the STA 106a to perform channel estimation using the NDP. In one aspect, the control information of a NDP may consist of or consist essentially of one or more of the fields described above as being included in all types of control frames (e.g., type field, CRC, TX power, etc.) and one or more of the following fields: a number of spatial streams for channel estimation and a channel bandwidth over which to estimate. The control information of the NDP may not include any additional fields.

In some aspects, a method of wireless communication comprises generating a null data packet frame comprising control information consisting essentially of the following: one or more of a length field, a cyclic redundancy check field, a transmit power indication field, a number of spatial streams field, and a channel bandwidth field. The method further comprises transmitting the null data packet frame.

In some aspects, one type of control frame is a probe request. For example, an STA 106a looking for an AP may send a probe request that an AP 104 responds to. In one aspect, the control information of a probe request may consist of or consist essentially of one or more of the fields described above as being included in all types of control frames (e.g., type field, CRC, TX power, etc.) and one or more of the following fields: a global address of the transmitter of the probe request and a service set identifier (SSID) field. The control information of the probe request may not include any additional fields. The SSID field may include a SSID or hash of an SSID for which the STA 106a is looking. The hash of the SSID may be for instance 4 bytes representing a portion of the full SSID or a CRC computed based on the full CRC. Further, the SSID field may not be included and thus any AP receiving the probe request may respond.

In some aspects, a method of wireless communication comprises generating a probe request frame comprising control information consisting essentially of the following: one or more of a length field, a cyclic redundancy check field, a transmit power indication field, a transmitter global address field, and a receiver service set identifier field. The method further comprises transmitting the probe request frame.

In some aspects, one type of control frame is a probe response. For example, an STA 106a looking for an AP may send a probe request that an AP 104 responds to with a probe response. In one aspect, the control information of a probe response may consist of or consist essentially of one or more of the fields described above as being included in all types of control frames (e.g., type field, CRC, TX power, etc.) and one or more of the following fields: a global address of the transmitter of the probe response, a global address of the receiver of the probe response, and a service set identifier (SSID) field. The control information of the probe response may not include any additional fields. The SSID field may include a SSID or hash of an SSID of the AP sending the probe response. Further, the SSID field may not be included for example if the probe request includes an SSID as the transmitter of the probe request may expect the probe response within a particular time interval. Therefore, if a probe response is received in that time interval with the address of the transmitter of the probe request, the transmitter may assume the SSID sent in the probe request.

In some aspects, a method of wireless communication comprises generating a probe response frame comprising control information consisting essentially of the following: one or more of a length field, a cyclic redundancy check field, a transmit power indication field, a transmitter global address field, a receiver global address field, and a transmitter service set identifier field. The method further comprises transmitting the probe response frame.

Figure 9:
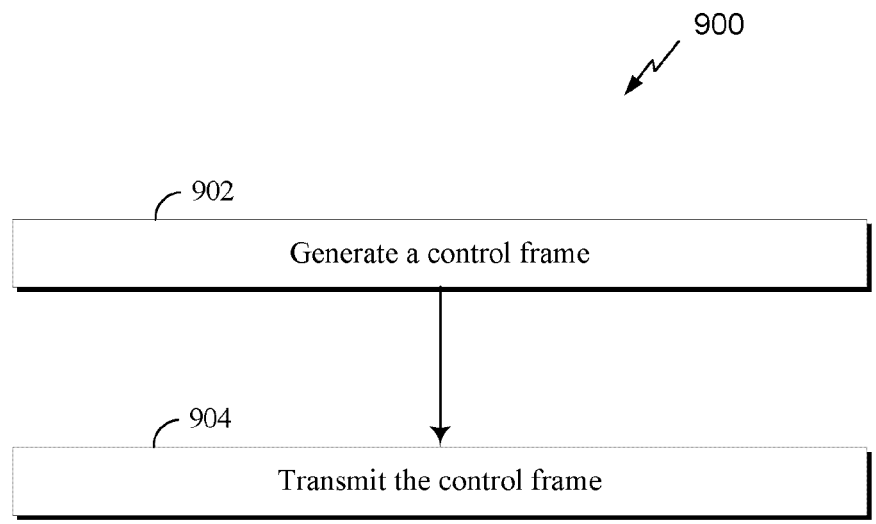
FIG. 9 shows a flow chart of an aspect of an exemplary method for generating and transmitting a control frame.

FIG. 9 shows a flowchart of an aspect of an exemplary method 900 for generating and transmitting a control frame. The method 900 may be used to generate and transmit any of the control frames described above. The control frame may be generated or transmitted from one wireless device 202 to another wireless device. Although the method 900 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 902, the processor 204 and/or the DSP 220 generates a control frame based on the content of the control frame. Then, at a block 904, the transmitter 210 transmits the control frame.

Figure 10:
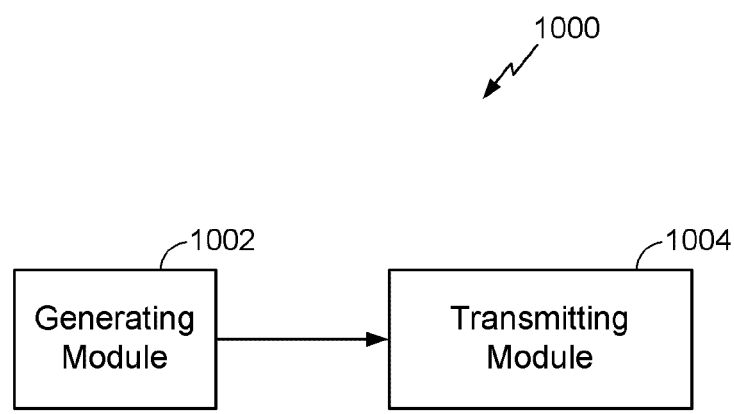
FIG. 10 is a functional block diagram of an exemplary wireless device that may be employed within the wireless communication system of FIG. 1.

FIG. 10 is a functional block diagram of an exemplary wireless device 1000 that may be employed within the wireless communication system 100. The device 1000 comprises a generating module 1002 for generating a control frame for wireless transmission. The generating module 1002 may be configured to perform one or more of the functions discussed above with respect to the block 902 illustrated in FIG. 9. The generating module 1002 may correspond to one or more of the processor 204 and the DSP 220. The device 1000 further comprises a transmitting module 1004 for wirelessly transmitting the data unit. The transmitting module 1004 may be configured to perform one or more of the functions discussed above with respect to the block 904 illustrated in FIG. 9. The transmitting module 1004 may correspond to the transmitter 210.

Figure 11:
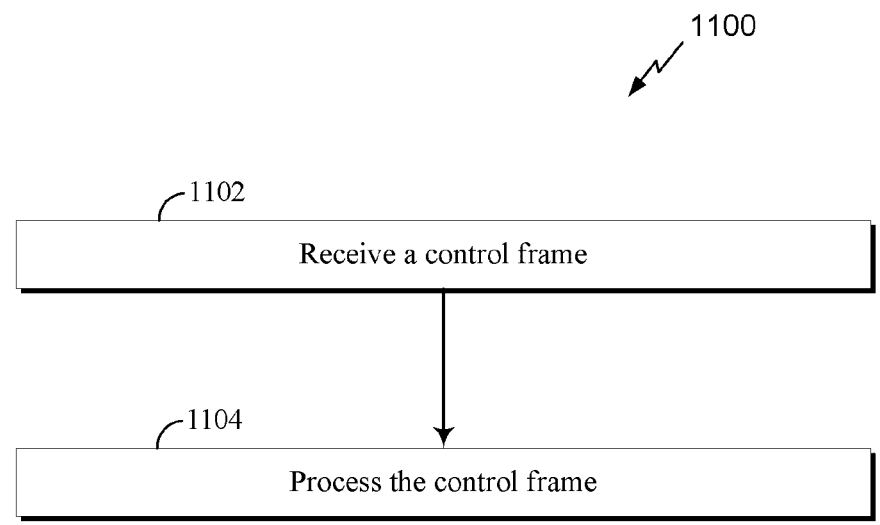
FIG. 11 shows a flow chart of an aspect of an exemplary method for receiving and processing a control frame.

FIG. 11 shows a flow chart of an aspect of an exemplary method 1100 for receiving and processing a control frame. The method 1100 may be used to receive and process any of the control frames described above. The control frame may be received and processed at any wireless device 202. Although the method 1100 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 1102, the receiver 212 receives a control frame. Then, at a block 1104, the processor 204 and/or the DSP 220 processes the control frame based on the content of the control frame.

Figure 12:
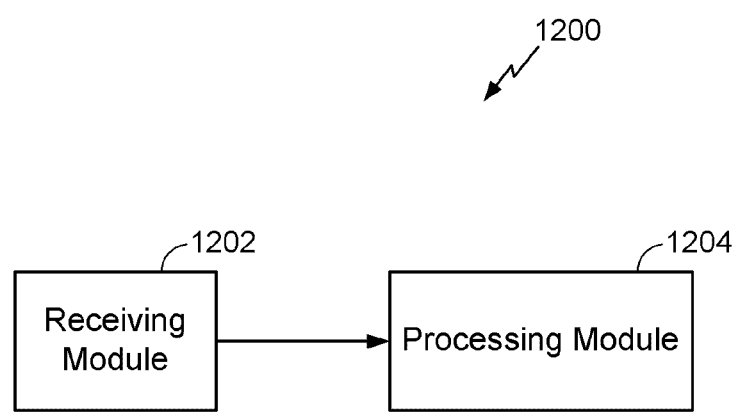
FIG. 12 is a functional block diagram of an exemplary wireless device that may be employed within the wireless communication system of FIG. 1.

FIG. 12 is a functional block diagram of an exemplary wireless device 1200 that may be employed within the wireless communication system 100. The device 1200 comprises a receiving module 1002 for receiving a control frame. The receiving module 1202 may be configured to perform one or more of the functions discussed above with respect to the block 1102 illustrated in FIG. 11. The receiving module 1202 may correspond to the receiver 212. The device 1200 further comprises a processing module 1204 for processing the control frame. The transmitting module 1204 may be configured to perform one or more of the functions discussed above with respect to the block 1104 illustrated in FIG. 11. The processing module 1204 may correspond to one or more of the processor 204 and the DSP 220.

As described above, one type of control frame is an acknowledgement (ACK) frame. For example, the STA 106a may send data to the AP 104 and, upon successful receipt of the data, the AP 104 may send an ACK to the STA 106a indicating successful receipt of the data to the STA 106a. In some aspects, the ACK may be sent in response to successful receipt of at least one of the following: a data frame, a management frame, a control frame, a PS-Poll, or another type of frame.

Figure 19:
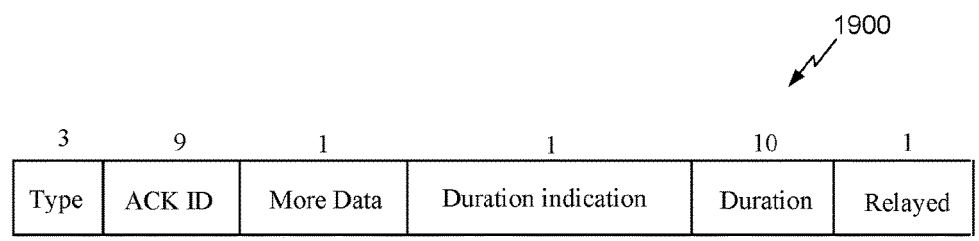
FIG. 19 illustrates an example of a 1 MHz NDP ACK frame.
Figure 20:
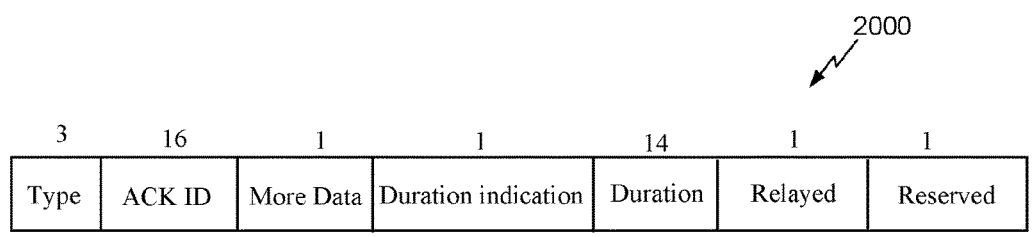
FIG. 20 illustrates an example of a NDP ACK frame that has a bandwidth greater than or equal to 2 MHz.

In some embodiments, an ACK frame may include a null data packet (NDP) ACK frame. In one embodiment, one type of NDP ACK frame includes an NDP ACK for all MAC protocol data units (MPDUs), which may be referred to herein as an NDP ACK frame. An NDP ACK frame may be a mandatory frame that is sent in response to all MPDUs, such as, for example, a protocol version 0 (PV-0) MPDU, a PV-1 MPDU, a PS-Poll, a NDP PS-Poll, and the like. A PV-0 MPDU is an MPDU that has protocol version (PV) value that equals 0 and a PV-1 MPDU is an MPDU that has protocol version value that equals 1. In some embodiments, the difference between a PV-0 and a PV-1 MPDU is that a PV-1 MPDU does not have a duration field and has shorter header, while a PV-0 MPDU does have a duration field and longer header. FIGS. 19 and 20 illustrate examples of a 1 MHz NDP ACK frame and a NDP ACK frame that has a bandwidth greater than or equal to 2 MHz, and are discussed below.

Figure 21:
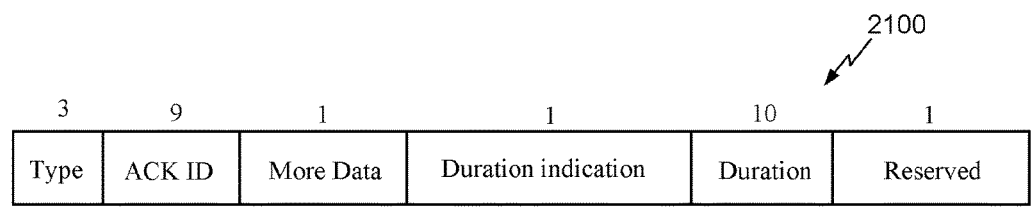
FIG. 21 illustrates an example of a 1 MHz NDP Modified ACK frame.
Figure 22:
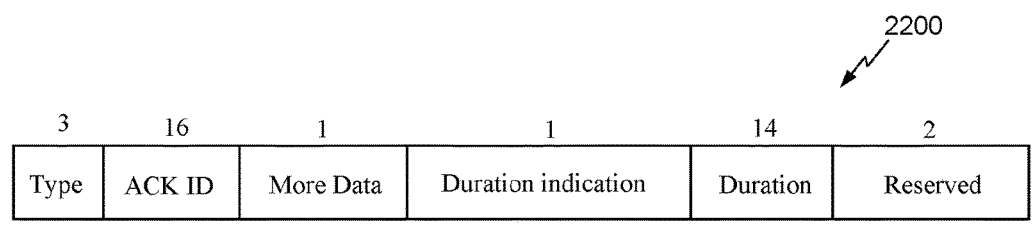
FIG. 22 illustrates an example of a NDP Modified ACK frame that has a bandwidth greater than or equal to 2 MHz.

In another embodiment, another type of NDP ACK frame includes a NDP Modified ACK that may be sent in response to a NDP PS-Poll. For example, the NDP Modified ACK may be sent only in response to received NDP PS-Polls. FIGS. 21 and 22 illustrate examples of a 1 MHz NDP Modified ACK frame and a NDP Modified ACK frame that has a bandwidth greater than or equal to 2 MHz, and are discussed below.

FIG. 19 illustrates an example of a 1 MHz NDP ACK frame 1900 according to the teachings herein. As shown, the NDP ACK frame 1900 includes a type field, an ACK identifier (ACK ID) field, a more data field, a duration indication field, a duration field, and a relayed frame field. As one example, the type field includes 3 bits, the ACK ID field includes 9 bits, the more data field includes 1 bit, the duration indication field includes 1 bit, the duration field includes 10 bits, and the relayed frame field includes 1 bit. One of skill in the art will appreciate that each of the fields may include other appropriate bit values. In some embodiments, the type field identifies the type of the control frame and the ACK ID may be used to identify the frame. The more data field may be used to indicates to the recipient of the frame that at least one frame is available to the recipient. In some embodiments, the duration field may be used to set or update a network allocation vector (NAV).

FIG. 20 illustrates an example of a NDP ACK frame 2000 that has a bandwidth greater than or equal to 2 MHz according to the teachings herein. As shown, the NDP ACK frame 2000 includes a type field, an ACK ID field, a more data field, a duration indication field, a duration field, a relayed frame field, and a reserved field. As one example, the type field includes 3 bits, the ACK ID field includes 16 bits, the more data field includes 1 bit, the duration indication field includes 1 bit, the duration field includes 14 bits, the relayed frame field includes 1 bit, and the reserved field includes 1 bit.

FIG. 21 illustrates an example of a 1 MHz NDP Modified ACK frame 2100 according to the teachings herein. As shown, the NDP Modified ACK frame 2100 includes a type field, an ACK ID field, a more data field, a duration indication field, a duration field, and a reserved field. As one example, the type field includes 3 bits, the ACK ID field includes 9 bits, the more data field includes 1 bit, the duration indication field includes 1 bit, the duration field includes 10 bits, and the reserved field includes 1 bit. The NDP Modified ACK 2100 may be sent only in response to received NDP PS-Polls that in one embodiment do not set the network allocation vector (NAV).

FIG. 22 illustrates an example of a NDP Modified ACK frame 2200 that has a bandwidth greater than or equal to 2 MHz according to the teachings herein. As shown, the NDP Modified ACK frame 2200 includes a type field, an ACK ID field, a more data field, a duration indication field, a duration field, and a reserved field. As one example, the type field includes 3 bits, the ACK ID field includes 16 bits, the more data field includes 1 bit, the duration indication field includes 1 bit, the duration field includes 14 bits, and the reserved field includes 2 bits.

Various issues may arise with the NDP ACK frames 1900, 2000 and the NDP Modified ACK frames 2100, 2200. For example, allocation of 9 bits for the ACK ID of the 1 MHz NDP ACK frame 1900 may not be enough bits to properly identify the frame.

Figure 23:
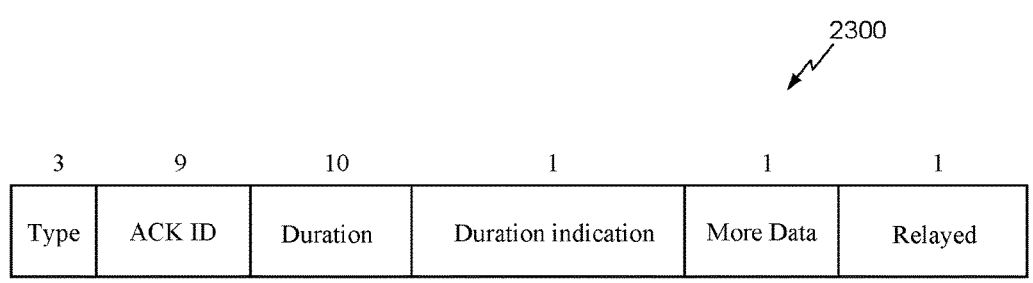
FIGS. 23 and 24 illustrate examples of unified 1 MHz NDP ACK frame and a unified NDP ACK frame that has a bandwidth greater than or equal to 2 MHz.
Figure 24:
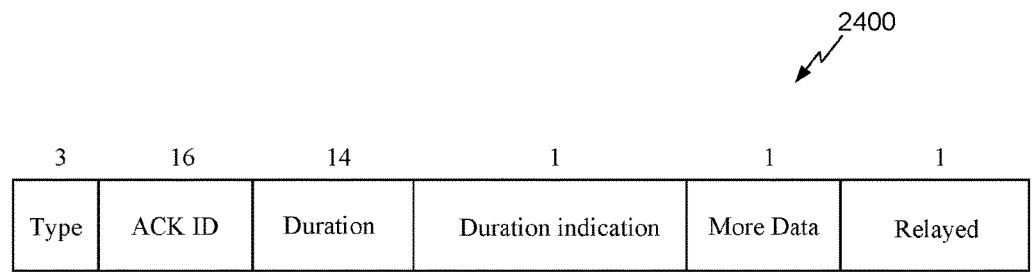

In some embodiments, the NDP ACK frame and the NDP modified ACK frame may be unified in order to overcome the above issues. FIGS. 23 and 24 illustrate examples of a 1 MHz NDP ACK frame and a NDP ACK frame that has a bandwidth greater than or equal to 2 MHz that unify the NDP ACK frame and the NDP modified ACK frame. FIG. 23 illustrates an example of a unified 1 MHz NDP ACK frame 2300 according to the teachings herein. FIG. 24 illustrates an example of a unified NDP ACK frame 2400 that has a bandwidth greater than or equal to 2 MHz according to the teachings herein. As shown, the unified 1 MHz NDP ACK frame 2300 and the unified NDP ACK frame 2400 that has a bandwidth greater than or equal to 2 MHz include a type field, an ACK ID field, a duration field, a duration indication field, a more data field, and a relayed frame field. As one example, the unified 1 MHz NDP ACK frame 2300 includes a type field including 3 bits, an ACK ID field including 9 bits, a duration field including 10 bits, a duration indication including 1 bit, a more data field including 1 bit, and a relayed frame field including 1 bit. As another example, the unified NDP ACK frame 2400 that has a bandwidth greater than or equal to 2 MHz includes a type field including 3 bits, an ACK ID field including 16 bits, a duration field including 14 bits, a duration indication including 1 bit, a more data field including 1 bit, and a relayed frame field including 1 bit.

In one embodiment, certain combinations of the NDP ACK frame may be used to signal certain information to the intended receiver. As an example, a device that is an AP can indicate to an intended STA to not transmit UL data frames to the AP for a given time interval which is specified in a duration field by setting the relayed frame bit to 1 and the duration indication to 1. This particular indication (jointly setting the relayed frame bit to 1 and the duration indication to 1) specifies that the receiving STA (and eventually all STAs associated to the AP or Relay AP) shall not transmit any UL data to the device they are associated to and sent this NDP ACK for the time period specified in the duration field of the NDP ACK. In general, any combination of some or all of the fields in the NDP ACK may be used to signal a certain condition that the device AP or relay requests its associated STAs to not access the medium for the duration of time indicated in the duration field.

In some embodiments, the ACK ID may be calculated based on a partial FCS of the soliciting frame. In some embodiments, the ACK ID may be calculated based on a scrambler seed of the soliciting frame. In some embodiments, the ACK ID may be calculated based on the PBSSID, PAID, and CRC for a NDP PS-Poll.

The duration indication field may be used to indicate whether a NAV is present. Based on the value of the duration indication field, the duration may be either a NAV value of a non-NAV value. In one example of a 1 MHz NDP ACK frame where a NAV value is used for the duration field, the NAV value may be up to 20.4 ms with a time unit (TU) equal to a short inter-frame space (SIFS). A SIFS is the time interval between a frame and an acknowledgement for that frame. In one example of a 2 MHz or greater NDP ACK frame where a NAV value is used, the NAV value may be up to 20.4 ms with a TU equal to a symbol.

In one example where a non-NAV value is used for the duration field, a sleep duration may be used for the duration field. For example, a sleep duration value may be included in the duration field for NDP PS-Polls, and may be up to 127 ms for a 1 MHz frame and up to 511 ms for a frame that has a bandwidth greater than or equal to 2 MHz, with a TU of 1 ms. In another example where a non-NAV value is used for the duration field, an ID Extension may be included in the duration field. For example, an STA interested in a longer ID may negotiate the usage of the duration field to extend its ID. If the duration indication does not indicate a NAV, the duration field will be of no interest to third party STAs.

In some embodiments, in order to overcome the above issues related to the ACK frames of FIGS. 19-22, one type of ACK frame may be used to respond to all frames that set a NAV (a NDP NAV ACK), and another type of ACK frame may be used to respond to all frames that do not set a NAV (a NDP ID Extension (IDE) ACK).

Figure 25:
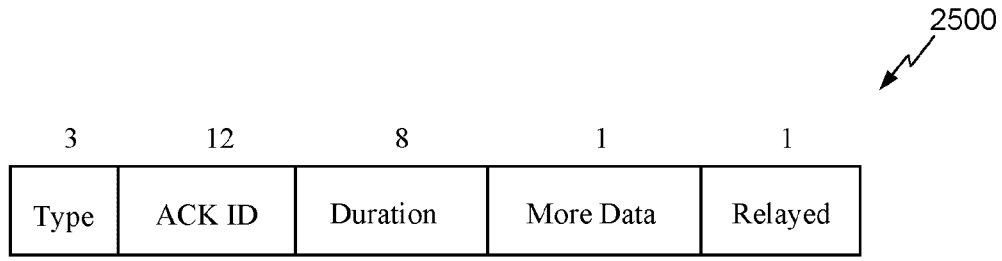
FIGS. 25 and 26 illustrate examples of a 1 MHz NDP NAV ACK frame and a NDP NAV ACK frame that has a bandwidth greater than or equal to 2 MHz.
Figure 26:
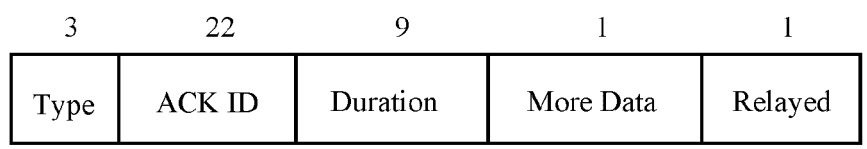

FIGS. 25 and 26 illustrate examples of a 1 MHz NDP NAV ACK frame 2500 and a NDP NAV ACK frame 2600 that has a bandwidth greater than or equal to 2 MHz that may be used to respond to all frames that set a NAV. As shown, the 1 MHz NDP ACK frame 2500 and the NDP ACK frame 2600 that has a bandwidth greater than or equal to 2 MHz include a type field, an ACK ID field, a duration field, a more data field, and a relayed frame field. As one example, the 1 MHz NDP NAV ACK frame 2500 includes a type field including 3 bits, an ACK ID field including 12 bits, a duration field including 8 bits, a more data field including 1 bit, and a relayed frame field including 1 bit. As another example, the NDP NAV ACK frame 2600 that has a bandwidth greater than or equal to 2 MHz includes a type field including 3 bits, an ACK ID field including 22 bits, a duration field including 9 bits, a more data field including 1 bit, and a relayed frame field including 1 bit. The value of the NAV duration field may be up to 20.4 ms with a TU of 80 µs for 1 MHz and a TU of 40 µs for a NDP ACK frame that has a bandwidth greater than or equal to 2 MHz.

Figure 27:
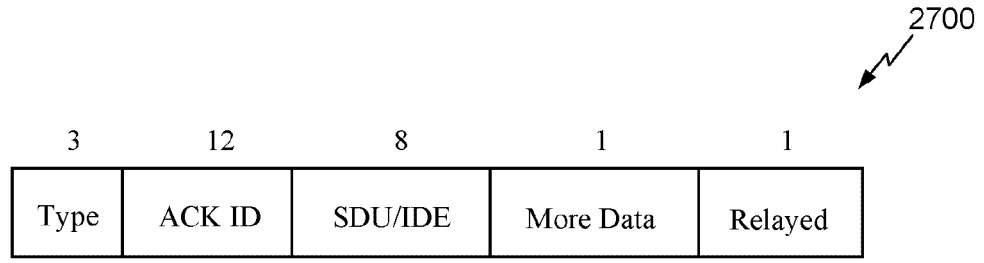
FIGS. 27 and 28 illustrate examples of a 1 MHz NDP IDE ACK frame and a NDP IDE ACK frame that has a bandwidth greater than or equal to 2 MHz.
Figure 28:
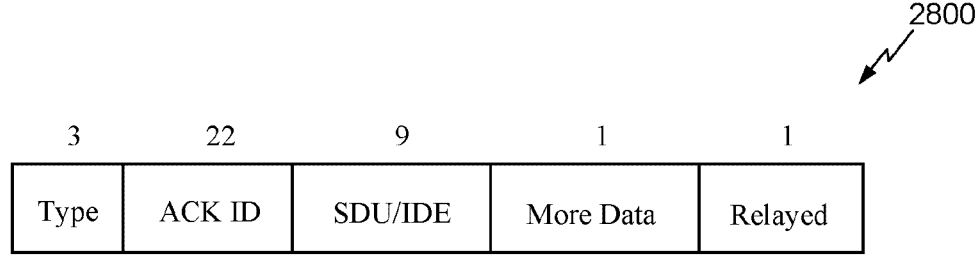

FIGS. 27 and 28 illustrate examples of a 1 MHz NDP IDE ACK frame 2700 and a NDP IDE ACK frame 2800 that has a bandwidth greater than or equal to 2 MHz that may be used to respond to all frames that do not set a NAV. As shown, the 1 MHz and the 2 MHz or greater NDP ACK frames 2700 and 2800 include a type field, an ACK ID field, a sleep duration/ ID extension (SDU/IDE) field, a more data field, and a relayed frame field. As one example, the 1 MHz NDP IDE ACK frame 2700 includes a type field including 3 bits, an ACK ID field including 12 bits, a SDU/IDE field including 8 bits, a more data field including 1 bit, and a relayed frame field including 1 bit. As another example, the 2 MHz or greater NDP IDE ACK frame 2800 includes a type field including 3 bits, an ACK ID field including 22 bits, a SDU/IDE field including 9 bits, a more data field including 1 bit, and a relayed frame field including 1 bit. The SDU/IDE field can be either a sleep duration (SDU) or an ID extension (IDE), depending on the type of received frame. For example, if the received frame is a PS-Poll, the SDU/IDE field may include a SDU. In some embodiments, the value of the SDU in the SDU/IDE field may be up to 255 ms for 1 MHz and up to 511 ms for a NDP IDE ACK frame that has a bandwidth greater than or equal to 2 MHz, both with a TU of 1 ms. As another example, if the received frame is a frame other than a PS-Poll, the SDU/IDE field may include an ID extension. An STA interested in a longer ID may negotiate usage of the SDU/IDE field to extend the STA's ID.

Accordingly, the ACK frames of FIGS. 23-28 may be used to overcome the issues relating to the ACK frames of FIGS. 19-23. For example, more than 9 bits are used for the ACK ID of each of the frames. As another example, NAV is supported for all ACKs that relate to MPDUs that set the NAV.

As described above, each of the control frames include a type field. The type of control frame may be identified using a type field value from, for example, 0 to 7. In some embodiments, the value of the type field for each type of control frame may be randomly assigned. However, randomly assigning to type field value may lead to cross-type false positives. In some embodiments, the type field values for control frames may be efficiently assigned based on the type of frame so that values should have maximum hamming distance to minimize cross-type false positives. For example, a control frame may be generated comprising a type value that is a maximum hamming distance from one or more type values of one or more other control frames. A hamming distance as used herein refers to the number of bits that are different between the values of two control frame. For example, the hamming distance between 000 and 011 is a distance of 2 because two of the three bits are different (the 2 least significant bits).

In some embodiments, if two types of frames are used, the maximum Hamming distance will be 3. For example, the type value of one control frame may be 000 and the type value of the other control frame may be 111, and 000 and 111 have a hamming distance of 3. In some embodiments, if four types of frames are used, the maximum Hamming distance will be 2. For example, the type value of a first control frame may be 000, the type value of a second control frame may be 011, the type value of a third control frame may be 101, and the type value of a fourth control frame may be 110, which all have a hamming distance of 2.

The control frames may include any of the control frames discussed above, such as a CTS frame, a NDP ACK frame, a NDP Modified ACK frame, a NDP block ACK frame, a unified 1 MHz NDP ACK frame or a NDP ACK frame greater than or equal to 2 MHz, a 1 MHz NDP NAV ACK frame or a NDP NAV ACK frame greater than or equal to 2 MHz, or a 1 MHz NDP IDE ACK frame or a NDP IDE ACK frame greater than or equal to 2 MHz. For example, if a CTS frame, a NDP ACK frame, a NDP Modified ACK frame, and a NDP block ACK frame are used, then values may be assigned to the type field of each frame so that a maximum hamming distance of 2 is achieved. In this example, the CTS frame may have a type field value of 000, the NDP ACK frame may have a type field value of 011, the NDP Modified ACK frame may have a type field value of 101, and the NDP block ACK frame may have a type field value of 110.

Figure 29:
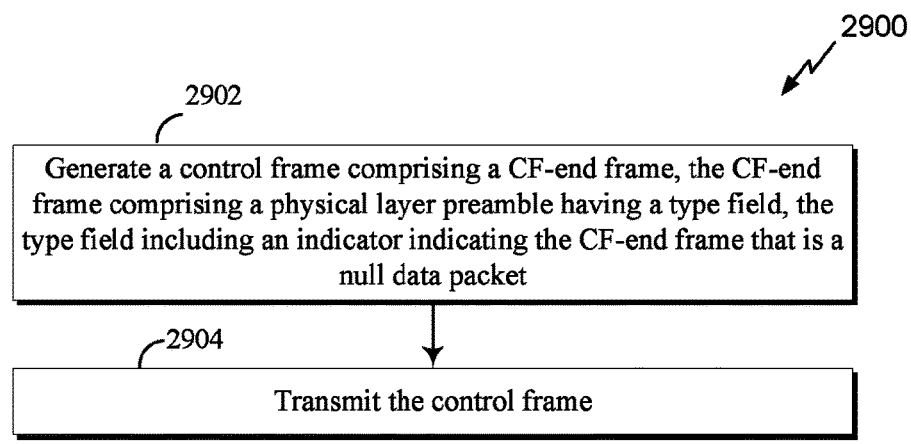
FIG. 29 shows a flow chart of an aspect of an exemplary method of wireless communication.

FIG. 29 shows a flow chart of an aspect of an exemplary method 2900 of wireless communication. The method 2900 may be used to assign the type field values described above. Although the method 2900 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

At block 2902, the method 2900 begins by generating a control frame comprising a contention free end (CF-end) frame, the CF-end frame comprising a physical layer preamble having a type field, the type field including an indicator indicating the CF-end frame is a null data packet (NDP). In some aspects, the CF-end frame may comprise a type field indicating an NDP type and a subtype field differentiating between a CF-end and a clear to send (CTS) subtype. At block 2904, the method 2900 continues by transmitting the control frame.

Figure 30:
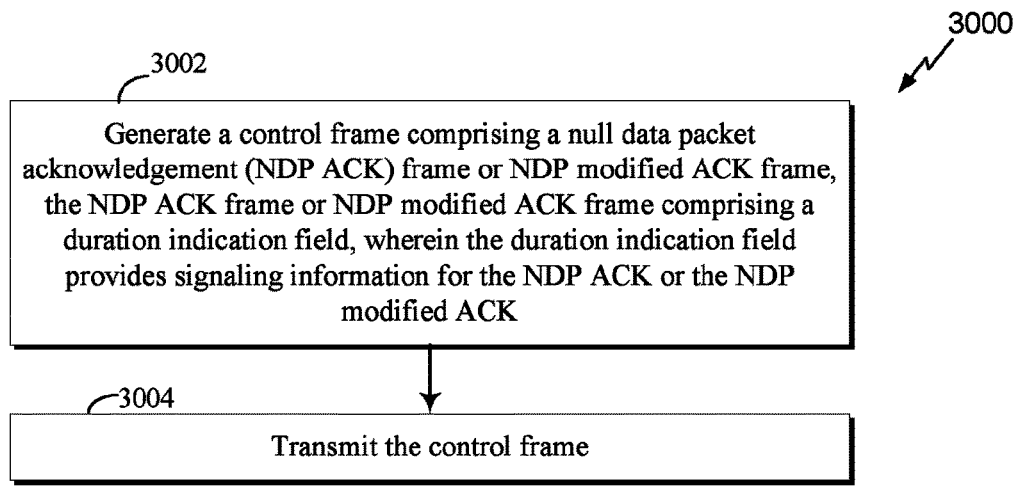
FIG. 30 shows a flow chart of an aspect of an exemplary method of wireless communication.

FIG. 30 shows a flow chart of an aspect of an exemplary method 3000 of wireless communication. The method 3000 may be used to assign the type field values described above. Although the method 3000 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

At block 3002, the method 3000 begins by generating a control frame comprising a null data packet acknowledgement (NDP ACK) frame or NDP modified ACK frame, the NDP ACK frame or NDP modified ACK frame comprising a duration indication field, wherein the duration indication field provides signaling information for the NDP ACK or the NDP modified ACK. In some aspects, the NDP ACK frame or NDP modified ACK frame further comprises a NDP frame type field, an identifier field, a duration field, and a field for storing additional data. At block 3004, the method 3000 continues by transmitting the control frame.

Figure 31:
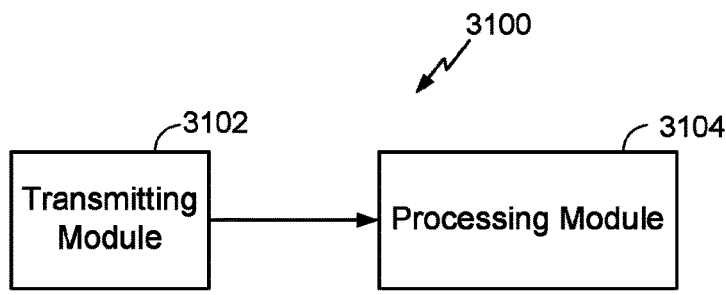
FIG. 31 is a functional block diagram of an exemplary wireless device that may be employed within the wireless communication system 100.

FIG. 31 is a functional block diagram of an exemplary wireless device 3100 that may be employed within the wireless communication system 100. The device 3100 comprises a generating module 3102 for generating a control frame comprising a contention free end (CF-end) frame, the CF-end frame comprising a physical layer preamble having a type field, the type field including an indicator indicating the CF-end frame is a null data packet (NDP). The generating module 3102 may also generate a control frame comprising a null data packet acknowledgement (NDP ACK) frame or NDP modified ACK frame, the NDP ACK frame or NDP modified ACK frame comprising a duration indication field, wherein the duration indication field provides signaling information for the NDP ACK or the NDP modified ACK The generating module 3102 may be configured to perform one or more of the functions discussed above with respect to the block 2902 illustrated in FIG. 29 or with respect to the block 3002 illustrated in FIG. 30. The generating module 3102 may correspond to the processor 204, the memory 206, and/or the DSP 220. The device 3100 further comprises a transmitting module 3104 for processing the control frame. The transmitting module 3104 may be configured to perform one or more of the functions discussed above with respect to the block 2904 illustrated in FIG. 29 or with respect to the block 3004 illustrated in FIG. 30. The transmitting module 3104 may correspond to one or more of the transmitter 210 or the transceiver 214.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects, computer readable medium may comprise non-transitory computer readable medium (e.g., tangible media). In addition, in some aspects, computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
generating, at a first device, a control frame comprising a null data packet acknowledgement (NDP ACK) frame or NDP modified ACK frame, the NDP ACK frame or NDP modified ACK frame comprising a duration field and a duration indication field, wherein the duration indication field provides signaling information for the NDP ACK or the NDP modified ACK, wherein the NDP ACK further comprises a relayed frame field, wherein providing signaling information comprises setting the duration indication field equal to 1, setting the relayed frame field equal to 1, and setting the duration field to a non-zero value to indicate to an intended station (STA) not to transmit any data frames for a time period equal to the non-zero value; and
transmitting the control frame to a second device.

2. The method of claim 1, wherein the null data packet acknowledgement (NDP ACK) frame or NDP modified ACK frame further comprise a type field, an identifier field, and a field for storing additional data.

3. The method of claim 1, wherein providing signaling information comprises setting the duration indication field equal to 1 to indicate an idle period.

4. The method of claim 1, wherein generating a control frame comprises generating a 1 MHz NDP ACK frame or 1 MHz NDP modified ACK frame.

5. The method of claim 1, wherein generating a control frame comprises generating a NDP ACK frame that has a bandwidth greater than or equal to 2 MHz or a NDP modified ACK frame that has a bandwidth greater than or equal to 2 MHz.

6. The method of claim 1, wherein the duration indication field indicates whether a network allocation vector (NAV) is present.

7. The method of claim 1, wherein the duration field indicates non-NAV value.

8. The method of claim 7, wherein the duration field indicates a sleep duration value.

9. The method of claim 7, wherein the duration field includes an identification (ID) extension field.

10. The method of claim 1, wherein the NDP ACK frame or NDP modified ACK frame further comprises a cyclic redundancy check (CRC) field to validate the control frame is correctly received.

11. The method of claim 1, wherein the NDP ACK frame or NDP modified ACK frame further comprises a transmit (TX) power indication field to estimate pathloss or change behavior of a device receiving the control frame.

12. The method of claim 2, wherein the type field includes 3 bits, the identifier field includes 9 bits, the duration indication field includes 1 bit, the duration field includes 10 bits, and the field for storing additional data includes 1 bit.

13. The method of claim 2, wherein the type field includes 3 bits, the identifier field includes 16 bits, the duration indication field includes 1 bit, the duration field includes 14 bits, and the field for storing additional data includes 1 bit.

14. The method of claim 2, wherein a value of the identifier field is based on one or more of a partial frame check sequence (FCS) of a received frame and a scrambler seed of the received frame.

15. The method of claim 2, wherein a value of the identifier field is based on one or more of a partial basic service set identifier (PBSSID), a partial association identifier (PAID), and a cyclic redundancy check (CRC) for a null data packet power save poll (NDP PS-Poll) frame.

16. The method of claim 2, wherein the type field indicates a buffer status.

17. The method of claim 2, wherein the duration field indicates a time delay value.

18. A device for communicating in a wireless network, the device comprising:
a processor configured to generate a control frame comprising a null data packet acknowledgement (NDP ACK) frame or NDP modified ACK frame, the NDP ACK frame or NDP modified ACK frame comprising a duration field and a duration indication field, wherein the duration indication field provides signaling information for the NDP ACK or the NDP modified ACK, wherein the NDP ACK further comprises a relayed frame field, wherein providing signaling information comprises setting the duration indication field equal to 1, setting the relayed frame field equal to 1, and setting the duration field to a non-zero value to indicate to an intended station (STA) not to transmit any data frames for a time period equal to the non-zero value; and
a transmitter configured to transmit the control frame to a second device.

19. The device of claim 18, wherein the null data packet acknowledgement (NDP ACK) frame or NDP modified ACK frame further comprise a type field, an identifier field, and a field for storing additional data.

20. The device of claim 18, wherein the signaling information comprises the duration indication field set to 1 to indicate an idle period.

21. The device of claim 18, wherein the NDP ACK frame and NDP modified ACK frame comprise a 1 MHz bandwidth frame.

22. The device of claim 18, wherein the NDP ACK frame and NDP modified ACK frame comprise a bandwidth frame that is greater than or equal to 2 MHz.

23. The device of claim 18, wherein the duration indication field indicates whether a network allocation vector (NAV) is present.

24. The device of claim 18, wherein the duration field indicates non-NAV value.

25. The device of claim 24, wherein the duration field indicates a sleep duration value.

26. The device of claim 24, wherein the duration field includes an identification (ID) extension field.

27. The device of claim 24, wherein the duration field indicates a time delay value.

28. The device of claim 18, wherein the NDP ACK frame or NDP modified ACK frame further comprises a cyclic redundancy check (CRC) field to validate the control frame is correctly received.

29. The device of claim 18, wherein the NDP ACK frame or NDP modified ACK frame further comprises a transmit (TX) power indication field to estimate pathloss or change behavior of a device receiving the control frame.

30. A method of wireless communication, comprising:
receiving, at a first device, a control frame from a second device, the control frame comprising a null data packet acknowledgement (NDP ACK) frame or NDP modified ACK frame, the NDP ACK frame or NDP modified ACK frame comprising a duration field and a duration indication field, wherein the duration indication field provides signaling information for the NDP ACK or the NDP modified ACK, wherein the NDP ACK further comprises a relayed frame field, wherein providing signaling information comprises setting the duration indication field equal to 1, setting the relayed frame field equal to 1, and setting the duration field to a non-zero value to indicate to an intended station (STA) not to transmit any data frames for a time period equal to the non-zero value; and
processing the control frame.

31. The method of claim 30, wherein the null data packet acknowledgement (NDP ACK) frame or NDP modified ACK frame further comprise a type field, an identifier field, and a field for storing additional data.

32. The method of claim 31, wherein processing the control frame comprises decoding the duration field such that it indicates a time delay value.

33. The method of claim 31, further comprising delaying transmission of a first frame based on a value of the duration field.

34. The method of claim 30, wherein processing the control frame comprises decoding a cyclic redundancy check (CRC) field of the control frame to validate the control frame is correctly received.

35. The method of claim 30, wherein processing the control frame comprises decoding a transmit (TX) power indication field to estimate pathloss or change behavior of the first device.

36. The method of claim 30, further comprising entering a sleep mode based on a value of the duration indication field.

37. A device for communicating in a wireless network, the device comprising:
a receiver configured to receive a control frame from a second device, the control frame comprising a null data packet acknowledgement (NDP ACK) frame or NDP modified ACK frame, the NDP ACK frame or NDP modified ACK frame comprising a duration field and a duration indication field, wherein the duration indication field provides signaling information for the NDP ACK or the NDP modified ACK, wherein the NDP ACK further comprises a relayed frame field, wherein providing signaling information comprises setting the duration indication field equal to 1, setting the relayed frame field equal to 1, and setting the duration field to a non-zero value to indicate to an intended station (STA) not to transmit any data frames for a time period equal to the non-zero value; and a processor configured to process the control frame.

38. The device of claim 37, wherein the null data packet acknowledgement (NDP ACK) frame or NDP modified ACK frame further comprise a type field, an identifier field, and a field for storing additional data.

39. The device of claim 37, wherein the processor is further configured to decode the duration field such that it indicates a time delay value.

40. The device of claim 37, wherein the processor is further configured to decode a cyclic redundancy check (CRC) field of the control frame to validate the control frame is correctly received.

41. The device of claim 37, wherein the processor is further configured to decode a transmit (TX) power indication field to estimate pathloss or change behavior of the first device.

42. The device of claim 37, wherein the processor is further configured to delay transmission of a first frame based on a value of the duration field.

43. The device of claim 37, wherein the processor is further configured to enter a sleep mode based on a value of the duration indication field.

\* \* \* \* \*